United States Patent
Kien et al.

(10) Patent No.: US 8,526,070 B2
(45) Date of Patent: Sep. 3, 2013

(54) DOCUMENT READING APPARATUS

(75) Inventors: Loi Yew Kien, Singapore (SG); Kalmekolan Madan Mohan Reddy, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 629 days.

(21) Appl. No.: 12/648,236

(22) Filed: Dec. 28, 2009

(65) Prior Publication Data

US 2010/0171996 A1 Jul. 8, 2010

(30) Foreign Application Priority Data

Jan. 6, 2009 (JP) .................................. 2009-000521
Jun. 30, 2009 (JP) .................................. 2009-155490
Jul. 23, 2009 (JP) .................................. 2009-172333

(51) Int. Cl.
*H04N 1/04* (2006.01)

(52) U.S. Cl.
USPC ............................ 358/474; 358/497; 358/471

(58) Field of Classification Search
USPC ........................................ 358/474, 497, 471
See application file for complete search history.

(56) References Cited

U.S. PATENT DOCUMENTS

| 5,229,596 A | 7/1993 | Ujihara |
| 5,355,146 A * | 10/1994 | Chiu et al. ........................ 345/156 |
| 5,578,813 A | 11/1996 | Allen et al. |
| 5,644,139 A | 7/1997 | Allen et al. |
| 5,686,720 A | 11/1997 | Tullis |
| 5,825,044 A | 10/1998 | Allen et al. |
| 5,994,710 A | 11/1999 | Knee et al. |
| 6,005,681 A | 12/1999 | Pollard |
| 6,010,072 A | 1/2000 | Matsumoto et al. |
| 6,265,706 B1 | 7/2001 | Oliver et al. |
| 7,466,462 B2 * | 12/2008 | Chen .............................. 358/497 |
| 2010/0123907 A1 * | 5/2010 | Edgar et al. ..................... 358/1.5 |

FOREIGN PATENT DOCUMENTS

| CN | 1280346 A | 1/2001 |
| JP | 06-078104 A | 3/1994 |
| JP | 06-217081 A | 8/1994 |
| JP | 08-147104 A | 6/1996 |
| JP | 08-265518 A | 10/1996 |
| JP | 09-312737 A | 12/1997 |
| JP | 11-345074 A | 12/1999 |
| JP | 2001-156999 A | 6/2001 |
| JP | 2003-219088 A | 7/2003 |
| WO | WO 00/26851 A1 | 5/2000 |

* cited by examiner

*Primary Examiner* — Houshang Safaipour
(74) *Attorney, Agent, or Firm* — Kilpatrick Townsend & Stockton LLP

(57) ABSTRACT

A document reading apparatus includes a housing including a bottom surface formed with a reading opening for reading a document, position detection sections disposed on the bottom surface while interposing the reading opening therebetween to detect a position of the document reading apparatus, and foot sections each having a contact surface being in contact with the document and a detection opening formed in a part of the contact surface, the detection opening facing the position detection section on the bottom surface.

10 Claims, 18 Drawing Sheets

DOCUMENT READING APPARATUS

This application claims priority to Japanese Patent Application No. 2009-000521, filed Jan. 6, 2009, Japanese Patent Application No. 2009-172333, filed Jul. 23, 2009 and Japanese Patent Application No. 2009-155490, filed Jun. 30, 2009, the disclosures of which are incorporated by reference herein.

BACKGROUND

1. Technical Field

The present invention relates to a document reading apparatus.

2. Related Art

According to the related art, hand scanning document reading apparatuses (e.g., a hand scanner, a mouse scanner or the like), which allow a bottom surface of a housing to make contact with a document to read the document from an opening formed in the bottom surface, are disclosed in JP-A-8-147104. Among them, there is a document reading apparatus which has a position detection section for detecting a position of the document reading apparatus relative to a document to be read, and specifies a position of image data of the document, which is fractionally read, relative to the entire document to generate image data of the entire document.

An example of the above-mentioned configuration is disclosed in WO00/26851.

However, due to bending of the document to be read, a problem may occur in that the position detection section abnormally detects the relative position of the document reading apparatus or cannot detect the position. Further, due to the shape or the like of the bottom surface, a problem may occur in that the document easily may not be read at a valley portion of a page formed at a gutter of a book, or the document is caught at the end thereof during a scanning operation. In this regard, it is necessary to improve the shape of the document reading apparatus in terms of convenience.

SUMMARY

An advantage of some aspects of the invention is to prevent a problem such as false detection from occurring due to a position detection section in a hand scanning document reading apparatus, and to improve the scanning efficiency.

According to a first aspect of the invention, there is provided a document reading apparatus including: a housing including a bottom surface formed with a reading opening for reading a document; position detection sections disposed on the bottom surface while interposing the reading opening therebetween to detect a position of the document reading apparatus; and foot sections each having a contact surface being in contact with the document and a detection opening formed in a part of the contact surface, the detection opening facing the position detection section on the bottom surface.

According to the document reading apparatus of the first aspect, the foot section having the contact surface and the detection opening is disposed in the bottom surface of the housing such that the detection opening faces the position detection section, so that it is possible to prevent a problem such as false detection from occurring due to the position detection section.

In the document reading apparatus according to the first aspect, the bottom surface may have a pair of long sides having a straight line shape and a pair of short sides connecting both ends of the long sides, and each foot section may be disposed between the reading opening and the short side. In such a case, the detection openings of the foot section face the position detection sections disposed while interposing the reading opening therebetween, so that it is possible to prevent the problem such as the false detection from occurring due to the position detection section.

In the document reading apparatus according to the first aspect, a distance in a short side direction of the bottom surface from the long side to the foot section may be shorter than a distance in the short side direction from the long side to the reading opening. In such a case, the foot section is located adjacently to the long side as compared with the reading opening, so that the scanning efficiency of the document reading apparatus can be improved.

In the document reading apparatus according to the first aspect, each foot section may have a chamfered portion formed on a circumference of the contact surface. In such a case, the foot section has the chamfered portion formed on the circumference of the contact surface, so that the scanning efficiency of the document reading apparatus can be improved.

According to a second aspect of the invention, there is provided a document reading apparatus including: a housing including a bottom surface having a reading opening for reading a document and a contact surface being in contact with the document; and position detection sections disposed on the bottom surface while interposing the reading opening therebetween to detect a position of the document reading apparatus, wherein the contact surface is formed to surround the position detection sections.

According to the document reading apparatus of the second aspect, the contact surface being in contact with the document is configured to surround the position detection section in the bottom surface of the housing, so that it is possible to prevent the problem such as the false detection from occurring due to the position detection section.

In the document reading apparatuses according to the first aspect and the second aspect, the housing may have a shape extending along a long side direction of the bottom surface, and may be formed in a trapezoidal sectional shape in a direction perpendicular to the extension direction. In such a case, the housing has the trapezoidal sectional shape, so that the scanning efficiency of the document reading apparatus can be improved.

In the document reading apparatuses according to the first aspect and the second aspect, a top surface of the housing may have a trapezoidal shape. In such a case, the top surface having the trapezoidal shape is provided, so that the scanning efficiency of the document reading apparatus can be improved.

According to a third aspect of the invention, there is provided a document reading apparatus including: a housing including a bottom surface formed with a pair of long sides having a straight line shape, a pair of short sides connecting both ends of the long sides, and an opening for reading a document; and foot sections disposed in ends of the bottom surface in a long side direction and having a shape extending along the short sides.

According to the document reading apparatus of the third aspect, the long side is formed in a straight line shape in the bottom surface of the housing, and the foot section has the shape extending along the short side, so that the scanning efficiency of the document reading apparatus can be improved.

The document reading apparatus according to the second aspect may further include a position detection section disposed between the opening and the foot section to detect the position of the document reading apparatus. In such a case, the movement amount and the movement direction of the document reading apparatus efficiently can be detected.

The invention can be realized in various forms. For example, the invention can be realized as a copy machine, a facsimile machine or the like, which is provided as a part thereof with a hand scanner, in addition to the hand scanner and the mouse scanner.

BRIEF DESCRIPTION OF THE DRAWINGS

The invention will be described with reference to the accompanying drawings, wherein like numbers reference like elements.

FIGS. 15A and 14B are exemplary views showing a state of the vicinity of a foot section when a document is read.

DESCRIPTION OF EXEMPLARY EMBODIMENTS

Hereinafter, a document reading apparatus embodied as a mouse scanner according to embodiments of the invention will be described with reference to the accompanying drawings.

A. First Embodiment

A1. External Configuration of Mouse scanner

Figure 1:
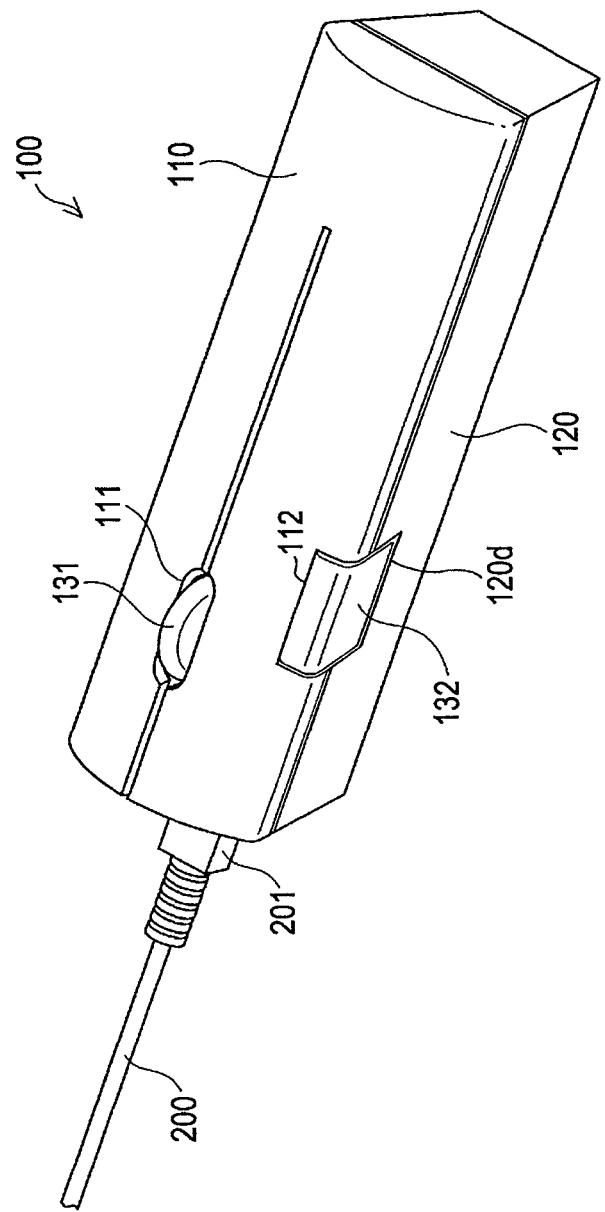
FIG. 1 is an exemplary view showing an external appearance of an upper side of a mouse scanner according to a first embodiment of the invention.
Figure 2:
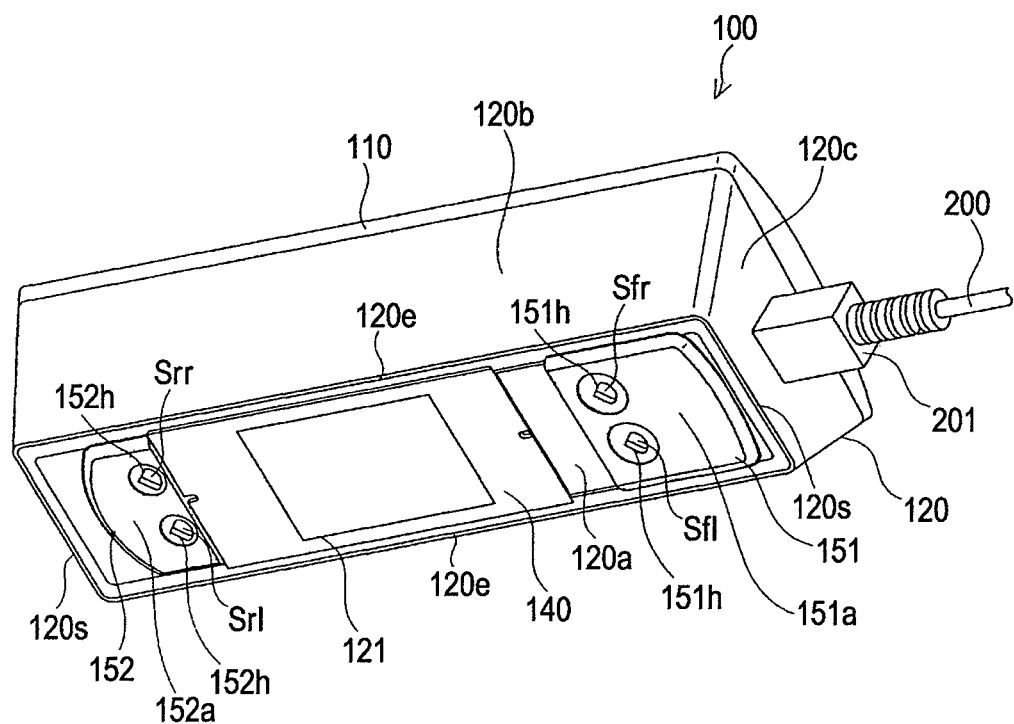
FIG. 2 is an exemplary view showing an external appearance of a lower side of a mouse scanner according to a first embodiment of the invention.
Figure 3:
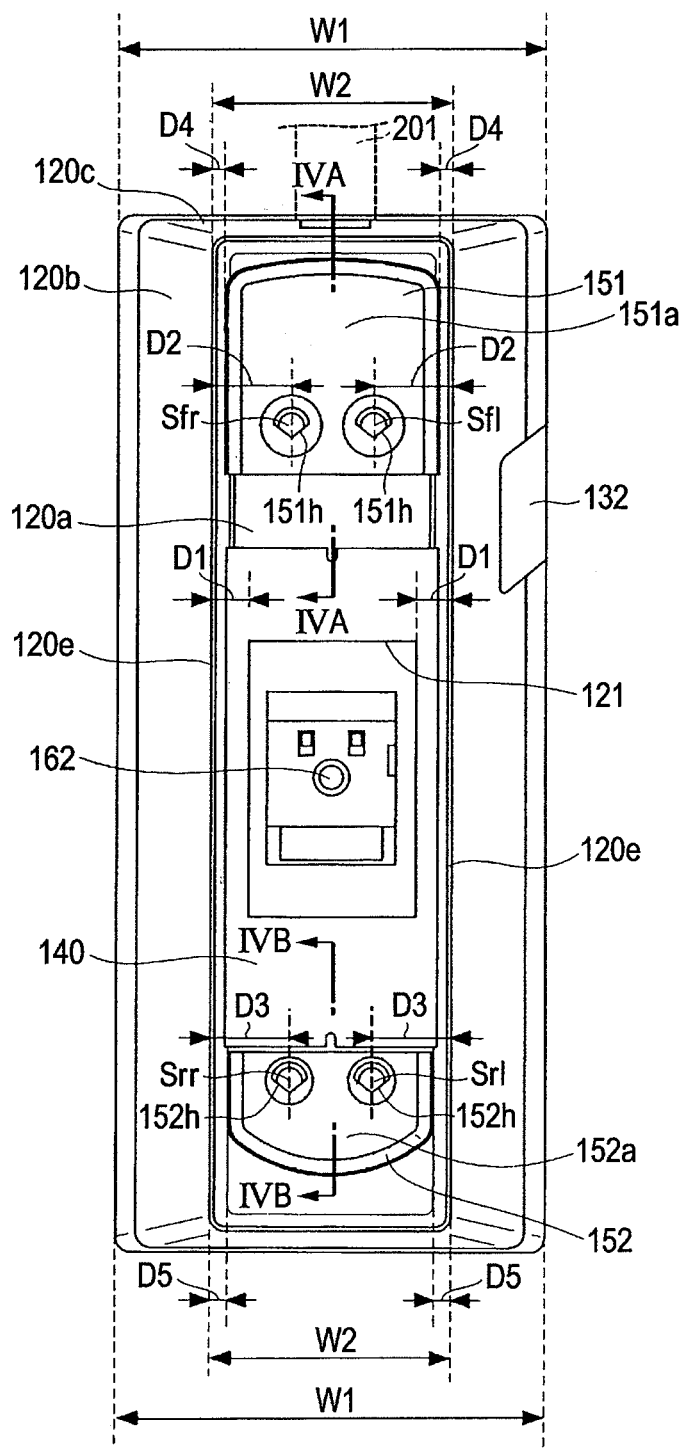
FIG. 3 is a view showing an arrangement configuration of a bottom portion of a mouse scanner.
Figure 4A:
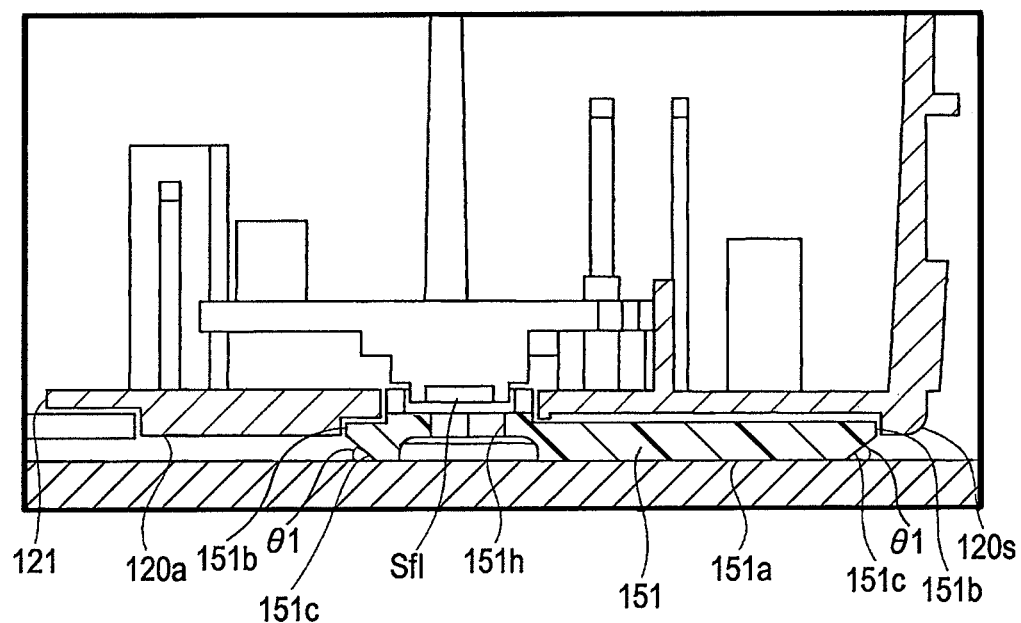
FIGS. 4A and 4B are exemplary views showing a part of a section of a mouse scanner according to a first embodiment.
Figure 4B:
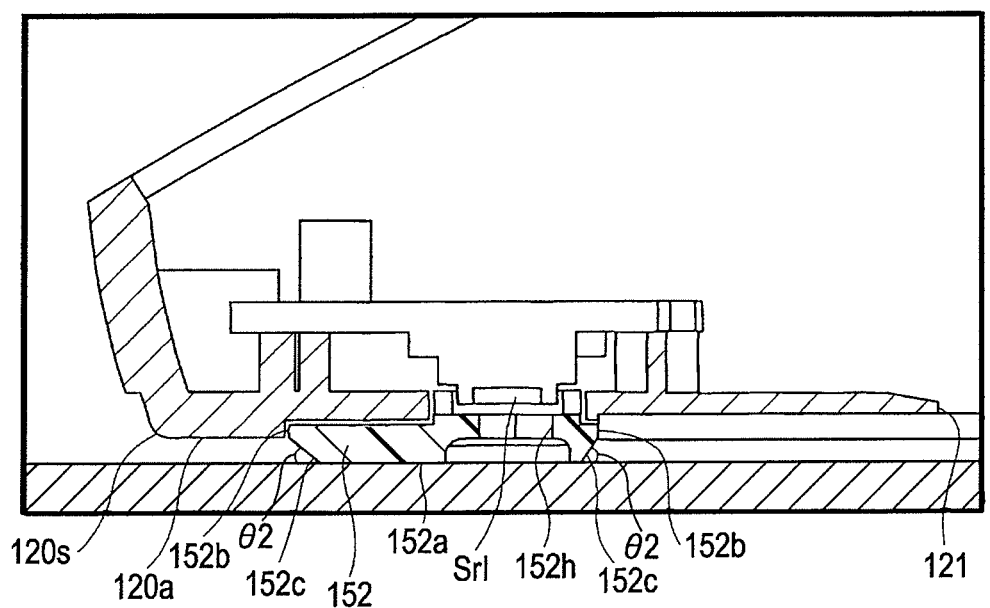

FIG. 1 is an exemplary view showing an external appearance of an upper side of the mouse scanner according to the first embodiment of the invention. FIG. 2 is an exemplary view showing an external appearance of a lower side of the mouse scanner according to the first embodiment of the invention. FIG. 3 is a view showing an arrangement configuration of a bottom portion of the mouse scanner. FIGS. 4A and 4B are exemplary views showing a part of a section of the mouse scanner according to the first embodiment. FIG. 4A is a sectional view taken along line IVA-IVA shown in FIG. 3 and FIG. 4B is a sectional view taken along line IVB-IVB shown in FIG. 3. The mouse scanner 100 serves as a pointing device used for manipulation of a computer (not shown) in addition to an image reading apparatus, which optically reads an object (a document) to be read to output image data to the computer connected through a cable 200. The mouse scanner 100 is what is called a hand scanning type scanner, and reads the document by manually scanning the object (the document) to be read while making contact with the object. As shown in FIGS. 1 to 3, the mouse scanner 100 includes an upper housing member 110, a lower housing member 120, a wheel 131, a reading button 132, a transmission plate 140, four position detection sections (a front right position detection section Sfr, a front left position detection section Sfl, a rear right position detection section Srr and a rear left position detection section Srl), a front foot section 151 and a rear foot section 152.

The upper housing member 110 is a cover member with an external appearance substantially of a long board shape and is disposed on the upper portion of the lower housing member 120. The upper housing member 110 and the lower housing member 120 form a housing of the mouse scanner 100. The upper housing member 110 substantially is formed at the center in the short side direction thereof with a wheel opening 111, so that a part of the wheel 131 disposed in the housing is exposed through the wheel opening 111. Further, the upper housing member 110 is formed at a part of the long side thereof with a notch portion 112 in which the reading button 132 is disposed. According to the embodiment, as shown in FIG. 3, the upper housing member 110 has a width W1 in the short side direction thereof.

The lower housing member 120 substantially has a box shape with an upper opening and includes a bottom surface 120a, two lateral sides 120b formed at the long side thereof, and two lateral sides 120c formed at the short side thereof. The bottom surface 120a is formed at the lower portion of the lower housing member 120 and substantially has a rectangular shape. The bottom surface 120a includes a long side 120e formed in the longitudinal direction thereof and substantially having a straight line shape, and a short side 120s formed in the direction (hereinafter, referred to as a transverse direction) perpendicular to the longitudinal direction and substantially having a straight line shape. As shown in FIG. 3, the width W2 of the short side 120s is formed to be shorter than the width W1 in the short side direction of the upper housing member 110. Thus, the mouse scanner 100 according to the embodiment substantially has a trapezoidal sectional shape in the direction perpendicular to the longitudinal direction. The lateral sides 120b are connected to the bottom surface 120a via the long side 120e. Further, the lateral sides 120c are connected to the bottom surface 120a via the short side 120s of the bottom surface 120a. According to the embodiment, the short side 120s is formed in the straight line shape. However, the invention is not limited thereto. For example, the short side 120s may be formed in a curved line shape such as a chevron shape.

One of the lateral sides 120c of the lower housing member 120 is formed with an opening (not shown) through which a connector 201 is connected to the lower housing member 120. Hereinafter, according to the embodiment, a side of one of the lateral sides 120c formed with the opening to connect with the connector 201 will be referred to as a front side of the mouse scanner 100, and a side of the other one of the lateral sides 120c will be referred to as a rear side.

In relation to the lower housing member 120, a reading opening 121 having a rectangular shape is formed substantially in the center of the bottom surface 120a. The reading opening 121 allows an imaging section (not shown) disposed in the housing to read the document. One pair of opening end sides of the reading opening 121 is formed substantially to be parallel to the long side 120e. According to the embodiment, the distance from the opening end side of the reading opening 121 to the long side 120e in the transverse direction of the bottom surface 120a is defined as D1. The reading opening 121 is covered by a transmission plate 140 made of transparent plastic plate, a glass plate or the like. In relation to the lower housing member 120, a notch portion 120d is formed in a part of the lateral side 120b at the position corresponding to the notch portion 112 of the upper housing member 110 such that the reading button 132 is disposed therein.

The four position detection sections (the front right position detection section Sfr, the front left position detection section Sfl, the rear right position detection section Srr and the rear left position detection section Srl) detect the movement amounts in two directions perpendicular to each other to specify the position of the mouse scanner 100 relative to the document to be read. The front right position detection section Sfr and the front left position detection section Sfl are disposed between the short side 120s formed at the front side and the reading opening 121 in the bottom surface 120a. Further, the rear right position detection section Srr and the rear left position detection section Srl are disposed between the short side 120s formed at the rear side and the reading opening 121 in the bottom surface 120a.

The distance D2 from the center of each of the front right position detection section Sfr and the front left position detection section Sfl to the long side 120e formed at the outer side of the bottom surface 120a is longer than the distance D1 from the opening end side of the reading opening 121 to the long side 120e. Further, the distance D3 from the center of each of the rear right position detection section Srr and the rear left position detection section Srl to the long side 120e is longer than the distance D1 from the opening end side of the reading opening 121 to the long side 120e. Herein, the distance D2 may be identical to or different from the distance D3.

Each of the front foot section 151 and the rear foot section 152 is a sliding member to reduce friction between the mouse scanner 100 and the document, and is made of plastic, urethane or the like. The front foot section 151 and the rear foot section 152 are disposed on the bottom surface 120a to form a convex section on the outer surface of the bottom surface 120a. Thus, when the document is scanned by the mouse scanner 100, the front foot section 151 and the rear foot section 152 make contact with the document.

The front foot section 151 has an external appearance substantially of a rectangular plate shape while being disposed between the short side 120s formed at the front side and the reading opening 121 with respect to the bottom surface 120a. The front foot section 151 is formed such that the distance D4 from the end of the front foot section 151 to the long side 120e is shorter than the distance D1 from the reading opening 121 to the long side 120e. Further, the front foot section 151 includes a contact surface 151a formed with two detection openings 151h, which is opposite to a surface making contact with the bottom surface 120a while making contact with the document. As shown in FIG. 4A, one of the detection openings 151h faces the front left position detection section Sfl, and the other one of the detection openings 151h faces the front right position detection section Sfr. Further, the front foot section 151 includes a lateral side 151b, which is formed in the thickness direction substantially to have a trapezoidal sectional shape, and a chamfered portion 151c formed between the contact surface 151a and the lateral side 151b. The chamfered portion 151c is configured to have an angle θ1 of 10° to 45° with respect to the document when the contact surface 151a makes contact with the document. It is preferred that the angle θ1 is about 28°.

The rear foot section 152 has an external appearance of a substantially rectangular plate shape while being disposed between the short side 120s formed at the rear side and the reading opening 121 with respect to the bottom surface 120a. The rear foot section 152 is formed such that the distance D5 from each end of the rear foot section 152 to the long side 120e is shorter than the distance D1 from the reading opening 121 to the long side 120e. Further, the rear foot section 152 includes a contact surface 152a formed with two detection openings 152h, which is opposite to the surface making contact with the bottom surface 120a while making contact with the document. As shown in FIG. 4B, one of the detection openings 152h faces the rear left position detection section Srl, and the other one of the detection openings 152h faces the rear right position detection section Srr. Further, the rear foot section 152 includes a lateral side 152b, which is formed in the thickness direction substantially to have a trapezoidal sectional shape, and a chamfered portion 152c formed between the contact surface 152a and the lateral side 152b. The chamfered portion 152c is configured to have an angle θ2 of 10° to 45° with respect to the document when the contact surface 152a makes contact with the document. It is preferred that the angle θ2 is about 28°.

A2. Position Detection by Mouse Scanner

Figure 5A:
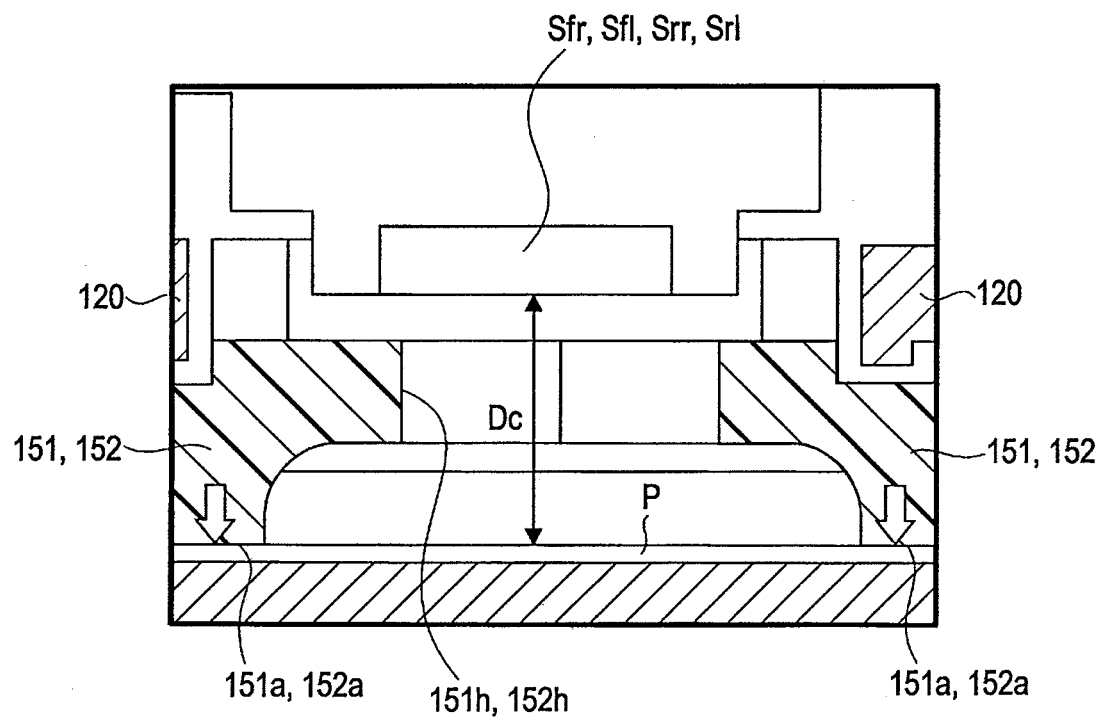
FIGS. 5A and 5B are exemplary views showing a state in the vicinity of a position detection section when a document is read.
Figure 5B:
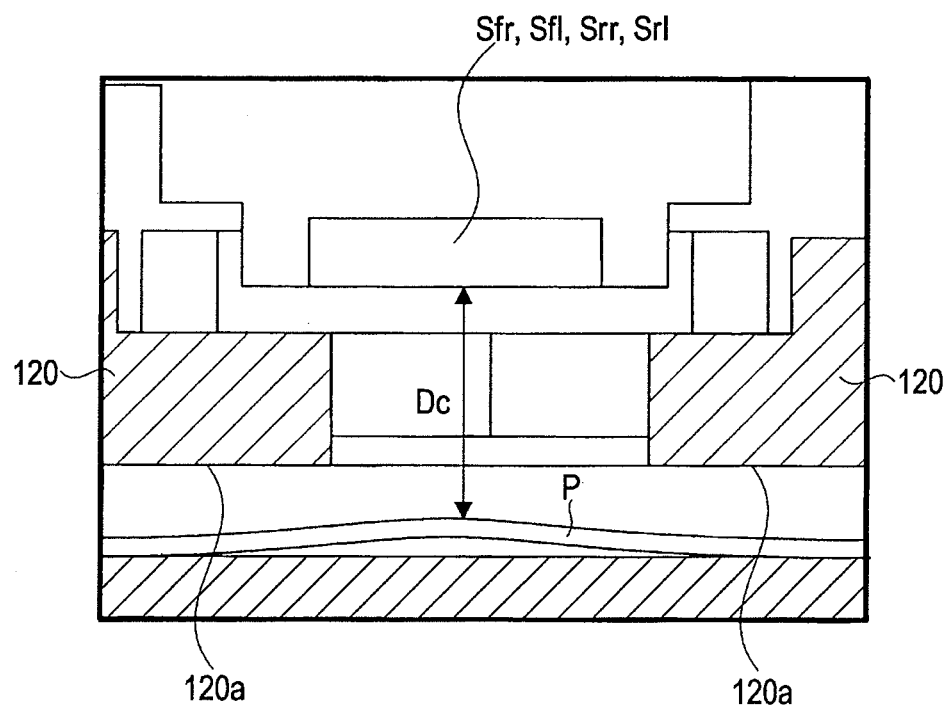

FIGS. 5A and 5B are exemplary views showing a state in the vicinity of the position detection section when the document is read. FIG. 5A is an exemplary view showing the vicinity of the position detection section of the document reading apparatus according to the invention. FIG. 5B is a comparative view showing the vicinity of the position detection section of the document reading apparatus having no foot section according to the invention. Since the detection opening 151h of the front foot section 151 is formed in a part of the contact surface 151a, the detection opening 151h is located closely or adjacently to the contact surface 151a. Accordingly, as expressed by the white arrow of FIG. 5A, the contact surface 151a of the front foot section 151 presses the document P at the position located adjacently or closely to the detection opening 151h, so that the document P can be prevented from being bent at the lower side of the detection opening 151h. Thus, the front right position detection section Sfr or the front left position detection section Sfl constantly can maintain the distance Dc between the front right position detection section Sfr or the front left position detection section Sfl and the document P via the detection opening 151h.

Similarly to this, since the detection opening 152h of the rear foot section 152 is formed in a part of the contact surface 152a, the detection opening 152h is located closely or adjacently to the contact surface 152a. Accordingly, the contact surface 152a of the rear foot section 152 presses the document P at the position located adjacently or closely to the detection opening 152h, so that the document P can be prevented from being bent at the lower side of the detection opening 152h. Thus, the rear right position detection section Srr or the rear left position detection section Srl can constantly maintain the distance Dc between the rear right position detection section Srr or the rear left position detection section Srl and the document P via the detection opening 152h. Meanwhile, when the contact surface of the foot section is not located closely or adjacently to the position detection section, since a gap occurs between the bottom surface 120a and the document P as shown in FIG. 5B, the document P may be from bent at the lower side of the position detection section. In such a case, the distance Dc between the position detection section and the document P constantly may not be maintained.

Figure 6A:
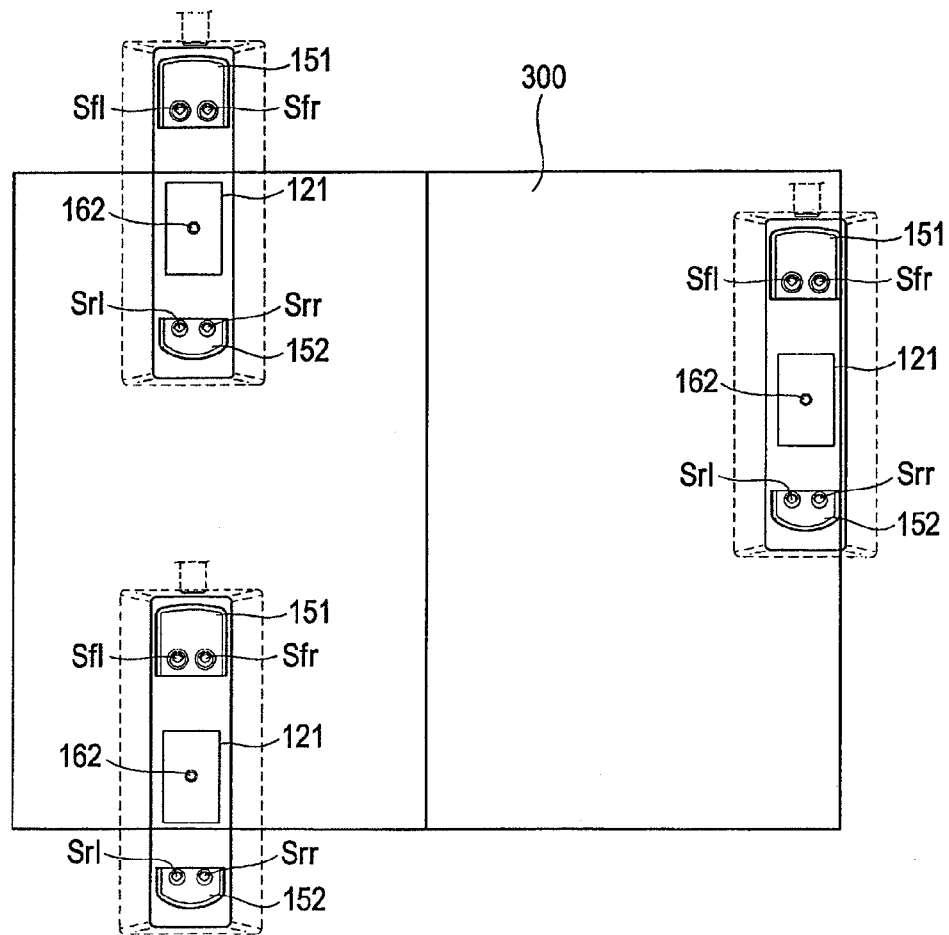
FIGS. 6A and 6B are views showing a position relation between a position detection section and a document.
Figure 6B:
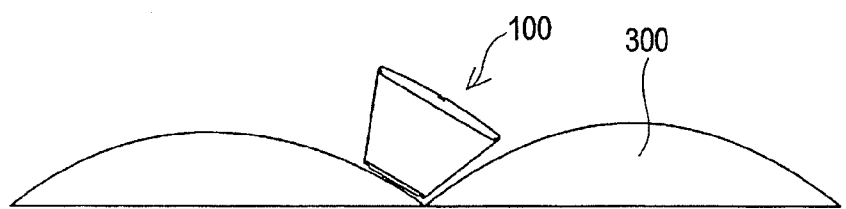

FIGS. 6A and 6B are views showing a position relation between the position detection section and the document. As shown in FIG. 6A, when the vicinity of the upper end of the page of a book 300 is read by the mouse scanner 100, the front right position detection section Sfr and the front left position detection section Sfl are departed from the surface of the document, but the rear right position detection section Srr and the rear left position detection section Srl remain on the surface of the document, so that the rotational direction and the rotational degree of the mouse scanner 100 can be calculated from the movement amount detected by the two position detection sections, in addition to the movement direction and the movement amount of the mouse scanner 100. Further, similarly to this, when the vicinity of the lower end of the page of the book 300 is read by the mouse scanner 100, the rear right position detection section Srr and the rear left position detection section Srl are departed from the surface of the document, but the front right position detection section Sfr and the front left position detection section Sfl remain on the surface of the document, so that the detection of the movement amount can be performed using the two position detection sections.

The four position detection sections (the front right position detection section Sfr, the front left position detection section Sfl, the rear right position detection section Srr and the rear left position detection section Srl) are disposed at positions remote from the long side 120e, as compared with the reading opening 121. Thus, although the opening end side of the reading opening 121 overlaps the edge end portion of the document in order to read the vicinity of the end portion near the fore edge of the page of the book 300, the four position detection sections Sfr, Sfl, Srr and Srl remain on the document. Consequently, even in such a case, the detection of the movement amount can be performed using the two or more position detection sections.

Further, the bottom surface 120a of the mouse scanner 100 is formed in the rectangular shape. Thus, even when reading the document having a chevron shape in the vicinity of a valley portion of a page formed at a gutter of the book 300 as shown in FIG. 6B, since the width in the transverse direction is smaller than the width in the longitudinal direction, the contact surfaces 151a and 152a of the foot section can make contact with the document. Thus, the detection of the movement amount can be performed using the two or more position detection sections. In addition, since the long side 120e substantially has a straight line shape, the mouse scanner 100 is allowed to crawl the valley portion of the page, so that reading of the document can be facilitated.

As compared with the reading opening 121, since the distance up to the long side 120e is short in the front foot section 151 and the rear foot section 152, even when reading the vicinity of the end of the document, at least a part of the contact surfaces 151a and 152a easily can be disposed on the document. Thus, it is possible to prevent the document from being caught when the front foot section 151 and the rear foot section 152, which have been departed from the document, are placed on the document again. Further, after being departed from the surface of the document, even if the front foot section 151 and the rear foot section 152 are placed on the document again, the end of the document to be contacted is moved downward by the chamfered portions 151c and 152c when they are placed thereon, so that the front foot section 151 and the rear foot section 152 can be easily placed thereon.

According to the mouse scanner 100 of the first embodiment as described above, the foot sections are disposed at the bottom surface of the housing such that the detection openings face the position detection sections, so that it is possible to prevent a problem such as false detection from occurring due to the position detection section. In detail, the detection openings 151h and 152h of the foot sections 151 and 152 according to the embodiment are respectively formed at a part of the contact surfaces 151a and 152a, so that the detection openings 151h and 152h are located closely or adjacently to the contact surfaces 151a and 152a, respectively. Accordingly, as expressed by the white arrow of FIG. 5A, the contact surfaces 151a and 152a of the foot sections 151 and 152 press the document P at the position located adjacently or closely to the detection openings 151h and 152h, so that the document P can be prevented from being bent at the lower sides of the detection openings 151h and 152h. Thus, the position detection sections Sfr, Sfl, Srr and Srl constantly can maintain the distance Dc between the position detection sections Sfr, Sfl, Srr and Srl and the document P via the detection openings 151h and 152h.

Since the position detection sections Sfr, Sfl, Srr and Srl irradiate a laser beam onto the document and detect the movement amount of the mouse scanner 100 by using reflected light from the document, when the distance Dc between the position detection sections Sfr, Sfl, Srr and Srl and the document P constantly is not maintained, the false detection may occur. However, according to the mouse scanner 100 of the embodiment, the distance Dc between the position detection sections Sfr, Sfl, Srr and Srl and the document P constantly can be maintained, so that it is possible to prevent the problem such as the false detection from occurring.

According to the mouse scanner 100 of the first embodiment, the position detection section and the foot section respectively are disposed between the reading opening and each short side, so that it is possible to prevent the problem such as the false detection from occurring due to the position detection section. In detail, in a state in which the mouse scanner 100 reads the vicinity of the upper end or the lower end of the document, the two position detection sections are respectively disposed between the reading opening 121 and each short side 120s such that at least two position detection sections are disposed on the document. The foot sections 151 and 152 respectively are disposed between the reading opening 121 and each short side 120s to cover the two position detection sections, so that the distance between the position detection sections and the document constantly can be maintained with high efficiency.

According to the mouse scanner 100 of the first embodiment, since the distance in the short side direction of the bottom surface from the long side formed at the bottom surface of the housing to the foot section is shorter than the distance in the short side direction from the long side to the reading opening, the scanning efficiency of the document reading apparatus can be improved. In detail, on the basis of the transverse direction of the bottom surface 120a, since the distance from the long side 120e to the front foot section 151 and the rear foot section 152 is shorter than the distance in the short side direction from the long side 120e to the reading opening 121, even when reading the vicinity of the end of the document, a part of the contact surfaces 151a and 152a easily can remain on the document and the document can be prevented from being caught by the front foot section 151 and the rear foot section 152.

According to the mouse scanner 100 of the first embodiment, the foot section has the chamfered portion, so that the scanning efficiency can be improved. In detail, when the front foot section 151 and the rear foot section 152, which have been departed from the document, are placed on the document again, the end of the document to be contacted can be moved downward by the chamfered portions 151c and 152c, so that the document can be prevented from being caught.

According to the mouse scanner 100 of the first embodiment, the housing has a shape extending along the long side direction of the bottom surface and is formed in a trapezoidal sectional shape in a direction perpendicular to an extension direction, so that the scanning efficiency of the document reading apparatus can be improved. In detail, since the mouse scanner 100 has the shape extending along the long side direction of the bottom surface 120a, the straight line shape of the long side 120e is adapted to the straight line shape of the valley of the page of the book, so that the reading opening 121 can be moved into the relatively deep position of the valley of the page, as compared with the existing document reading apparatus. Further, since the width in the short side direction of the upper housing member 110 is wider than the width of the bottom surface 120a, it is easy to hold the document reading apparatus. In addition, during the scanning operation, interference between the housing and the chevron-shaped portion of the page is suppressed, so that the mouse scanner 100 can easily perform a scanning operation.

B. Second Embodiment

B1. External Configuration of Mouse scanner

In the first embodiment, the mouse scanner provided with the foot section is described. However, in the second embodiment, the mouse scanner with no foot section, which has a shape identical to that of the foot section while being formed at the bottom surface of the housing, will be described.

Figure 7:
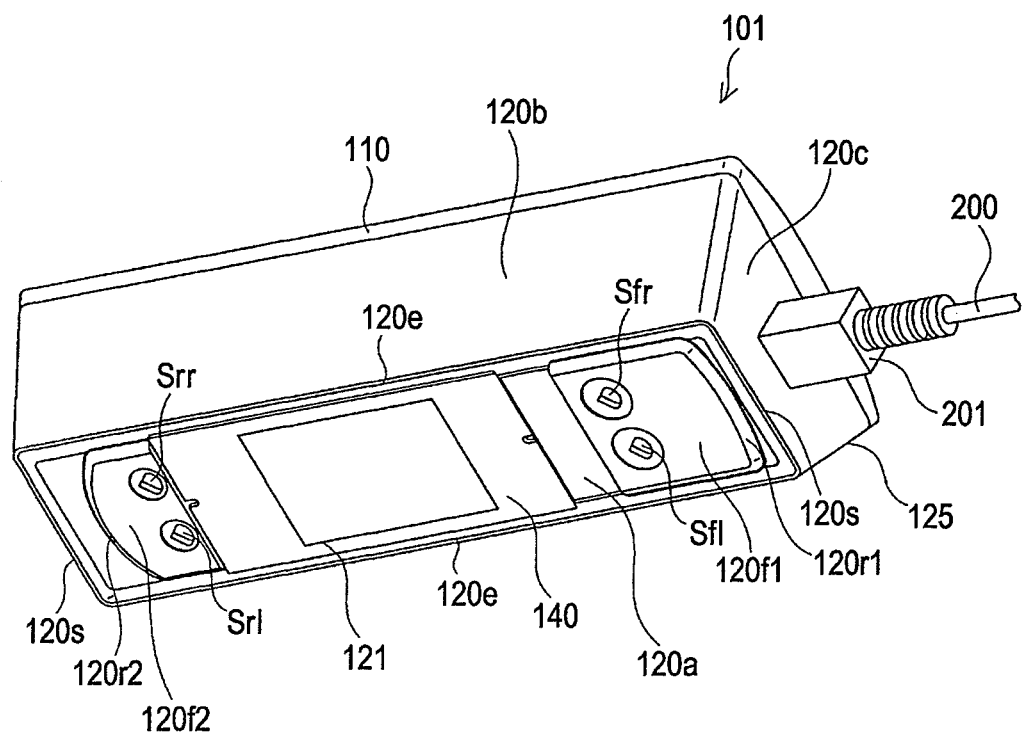
FIG. 7 is an exemplary view showing an external appearance of a lower side of a mouse scanner according to a second embodiment of the invention.
Figure 8A:
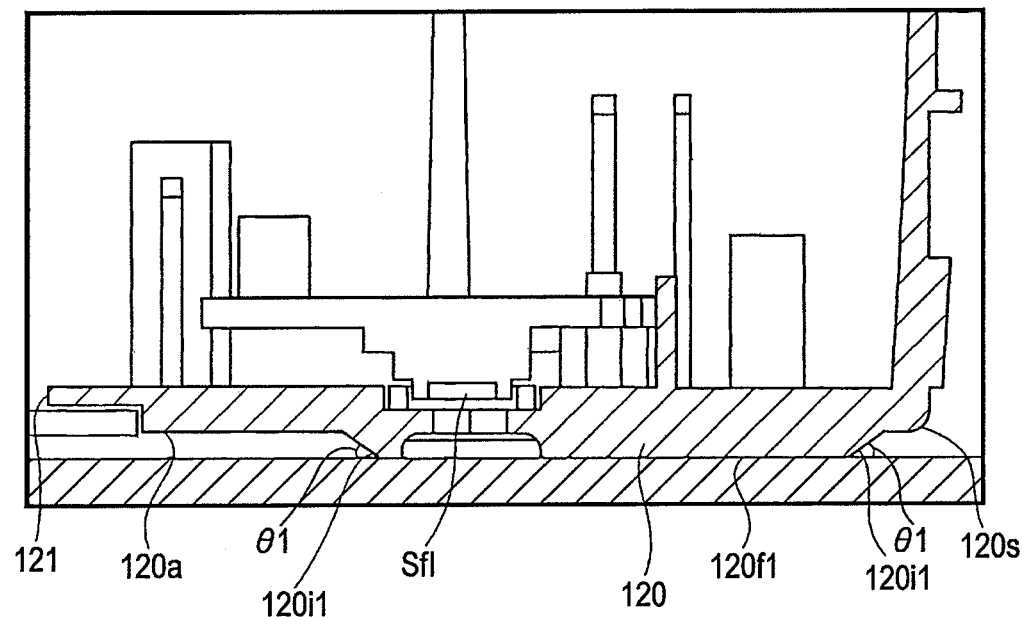
FIGS. 8A and 8B are exemplary views showing a part of a section of a mouse scanner according to a second embodiment.
Figure 8B:
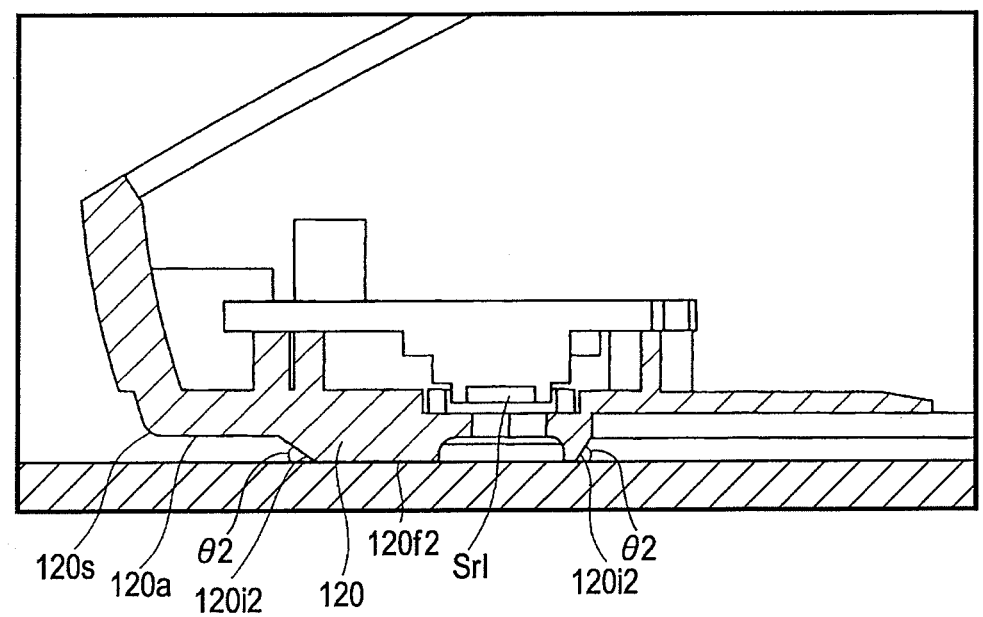

FIG. 7 is an exemplary view showing an external appearance of a lower side of the mouse scanner according to the second embodiment of the invention. FIGS. 8A and 8B are exemplary views showing a part of a section of the mouse scanner according to the second embodiment. FIG. 8A is an exemplary view showing the section of the mouse scanner according to the second embodiment, which corresponds to that of FIG. 4A, and FIG. 8B is an exemplary view showing the section of the mouse scanner according to the second embodiment, which corresponds to that of FIG. 4B. In the second embodiment, since elements with the same reference numerals as those of the first embodiment have the same shapes and functions as those of the first embodiment, a detailed description thereof will be omitted.

As shown in FIG. 7, the mouse scanner 101 according to the second embodiment includes an upper housing member 110, a lower housing member 125, a transmission plate 140, and four position detection sections (a front right position detection section Sfr, a front left position detection section Sfl, a rear right position detection section Sn and a rear left position detection section Srl). Further, similarly to the mouse scanner 100 as shown FIG. 1, the mouse scanner 101 includes the wheel 131 and the reading button 132. Since the upper external appearance of the mouse scanner 101 and the arrangement configuration of the bottom surface 120a are identical to those of the first embodiment, a detailed description thereof will be omitted.

According to the mouse scanner 101, a front convex section 120r1 is formed on the bottom surface 120a, instead of the front foot section 151 of the mouse scanner 100, and a rear convex section 120r2 is formed instead of the rear foot section 152 thereof. As shown in FIG. 8A, the front convex section 120r1 is formed integrally with the lower housing member 125, and includes a contact surface 120f1 that makes contact with a document, and a chamfered portion 120i1 formed between the contact surface 120f1 and the bottom surface 120a. The contact surface 120f1 has an external appearance substantially of a rectangular shape to surround the front right position detection section Sfr and the front left position detection section Sfl. The chamfered portion 120i1 has an angle θ1 of 10° to 45° with respect to the document when the contact surface 120f1 makes contact with the document. It is preferred that the angle θ1 is about 28°.

As shown in FIG. 8B, the rear convex section 120r2 is formed integrally with the lower housing member 125, and includes a contact surface 120f2 that makes contact with a document, and a chamfered portion 120i2 formed between the contact surface 120f2 and the bottom surface 120a. The contact surface 120f2 has an external appearance substantially of a rectangular shape to surround the rear right position detection section Srr and the rear left position detection section Srl. The chamfered portion 120i2 has an angle θ2 of 10° to 45° with respect to the document when the contact surface 120f2 makes contact with the document. It is preferred that the angle θ2 is about 28°.

According to the mouse scanner 101 of the second embodiment as described above, although the mouse scanner has no foot section, it is possible to prevent the problem such as the false detection from occurring due to the position detection section. In detail, the convex sections are formed on the bottom surface of the housing instead of the foot section, and the contact surfaces formed on the convex sections press the document, so that the distance between the document and the position detection section can be constantly maintained, and it is possible to prevent the problem such as the false detection from occurring due to the position detection section.

According to the mouse scanner 101 of the second embodiment, in relation to the bottom surface of the housing, the contact surface making contact with the document is configured to surround the position detection section, so that it is possible to prevent the problem such as the false detection from occurring due to the position detection section. In detail, the contact surfaces 120f1 and 120f2 of the front convex section 120r1 and the rear convex section 120r2 press the document at the positions located adjacently or closely to the lower sides of the position detection sections, so that the distance between the document and the position detection section constantly can be maintained at the lower sides of the position detection sections.

C. Third Embodiment

C1. External Configuration of Mouse Scanner

Figure 9:
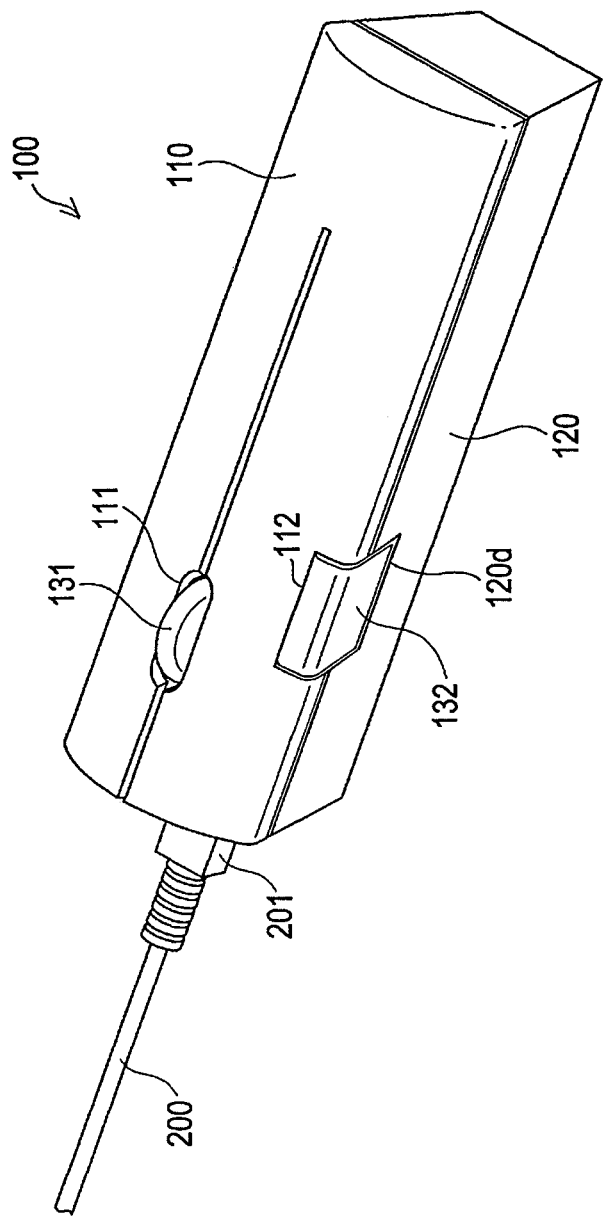
FIG. 9 is an exemplary view showing an external appearance of an upper side of a mouse scanner according to a third embodiment of the invention.
Figure 10:
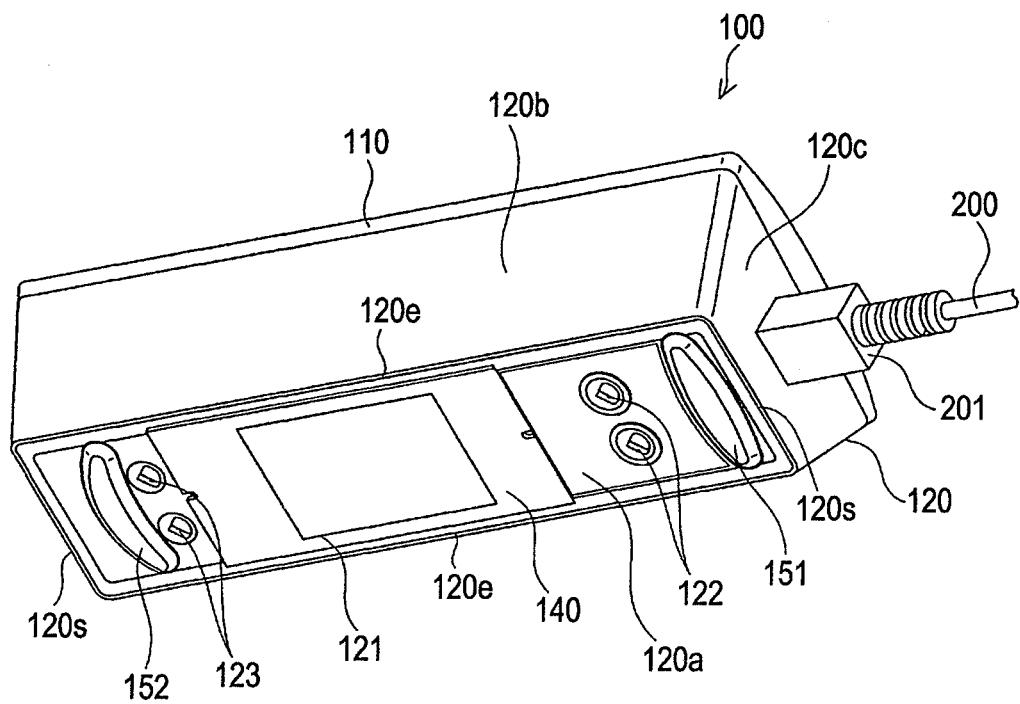
FIG. 10 is an exemplary view showing an external appearance of a lower side of a mouse scanner according to a third embodiment of the invention.
Figure 11:
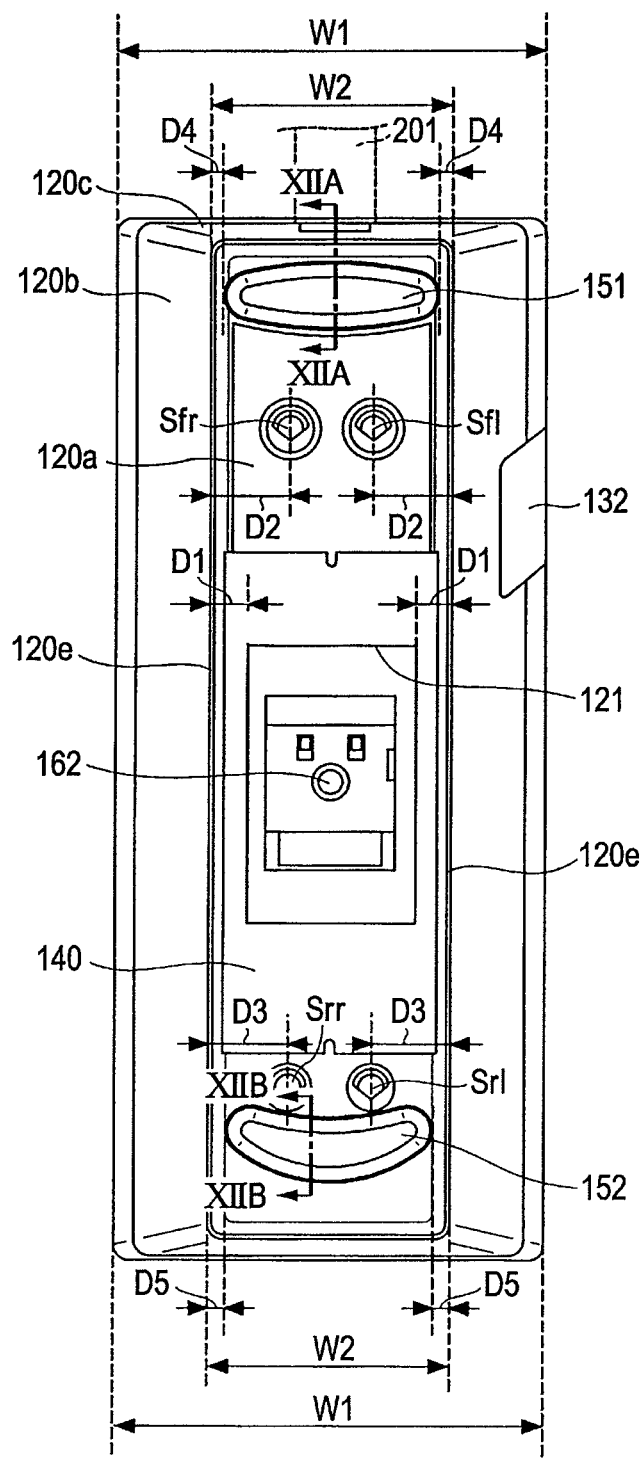
FIG. 11 is a view showing an arrangement configuration of a bottom portion of a mouse scanner.

FIG. 9 is an exemplary view showing an external appearance of an upper side of the mouse scanner according to the third embodiment of the invention. FIG. 10 is an exemplary view showing an external appearance of a lower side of the mouse scanner according to the third embodiment of the invention. FIG. 11 is a view showing an arrangement configuration of a bottom portion of the mouse scanner. The mouse scanner 100 serves as a pointing device used for manipulation of a computer (not shown) as well as an image reading apparatus, which optically reads an object (a document) to be read to output image data to the computer connected through a cable 200. The mouse scanner 100 is what is called a hand scanning type scanner, and reads a document by manually scanning the object (the document) to be read while making contact with the object. As shown in FIGS. 9 and 10, the mouse scanner 100 includes the upper housing member 110, the lower housing member 120, the wheel 131, the reading button 132, the transmission plate 140, the front foot section 151 and the rear foot section 152.

The upper housing member 110 is a cover member with an external appearance substantially of a long board shape and is disposed on the upper portion of the lower housing member 120. The upper housing member 110 and the lower housing member 120 form a housing of the mouse scanner 100. The upper housing member 110 is formed at the substantially center in the short side direction thereof with a wheel opening 111, so that a part of the wheel 131 disposed in the housing is exposed through the wheel opening 111. Further, the upper housing member 110 is formed at a part of the long side thereof with a notch portion 112 in which the reading button 132 is disposed. According to the embodiment, as shown in FIG. 11, the upper housing member 110 has a width W1 in the short side direction thereof.

The lower housing member 120 has a substantially box shape with an upper opening and includes a bottom surface 120a, lateral sides 120b formed at the long side thereof, and lateral sides 120c formed at the short side thereof. The bottom surface 120a is formed at the lower portion of the lower housing member 120 and substantially has a rectangular shape. The bottom surface 120a includes a long side 120e formed in the longitudinal direction thereof and substantially having a straight line shape, and a short side 120s formed in the direction (hereinafter, referred to as a transverse direction) perpendicular to the longitudinal direction and substantially having a straight line shape. As shown in FIG. 11, the width W2 of the short side 120s is formed to be narrower than the width W1 in the short side direction of the upper housing member 110. Thus, the mouse scanner 100 according to the embodiment substantially has a trapezoidal sectional shape in the direction perpendicular to the longitudinal direction. The lateral sides 120b are aligned adjacent to the bottom surface 120a via the long side 120e. Further, the lateral sides 120c are aligned adjacent to the bottom surface 120a via the short side 120s of the bottom surface 120a. According to the embodiment, the short side 120s is formed in a straight line shape. However, the invention is not limited thereto. For example, the short side 120s may be formed in a curved line shape such as a chevron shape.

The lateral side 120c of the lower housing member 120 is formed with an opening (not shown) through which a connector 201 is connected to the lower housing member 120. Hereinafter, according to the embodiment, a side of one of the lateral sides 120c formed with the opening will be referred to as a front side of the mouse scanner 100, and a side of the other one of the lateral sides 120c will be referred to as a rear side.

In relation to the lower housing member 120, a document reading opening 121 having a rectangular shape is formed substantially in the center of the bottom surface 120a. The document reading opening 121 allows an imaging section (not shown) disposed in the housing to read the document. One pair of end sides of the document reading opening 121 is formed to be substantially parallel to the long side 120e. According to the embodiment, the distance from the end side of the document reading opening 121 to the long side 120e in the transverse direction of the bottom surface 120a is defined as D1. The document reading opening 121 corresponds to an opening in the scope of the appended claims.

The lower housing member 120 is formed with front position detection openings 122 having two small windows formed in a row along the transverse direction of the bottom surface 120a between the short side 120s formed at the front side of the bottom surface 120a and the document reading opening 121. Further, the lower housing member 120 is formed with rear position detection openings 123 having two small windows formed in a row along the transverse direction of the bottom surface 120a between the short side 120s formed at the rear side and the document reading opening 121. The front position detection openings 122 are disposed such that the distance D2 from the center of each front position detection opening 122 to the long side 120e is longer than the distance D1 from the end side of the document reading opening 121 to the long side 120e. Further, the rear position detection openings 123 are disposed such that the distance D3 from the center of each rear position detection opening 123 to the long side 120e is longer than the distance D1 from the end side of the document reading opening 121 to the long side 120e. Herein, the distance D2 may be identical to or different from the distance D3.

In relation to the lower housing member 120, the notch portion 120d is formed in a part of the lateral side 120b at the position corresponding to the notch portion 112 of the upper housing member 110. The reading button 132 is disposed in the opening formed by the notch portions of the upper housing member 110 and the lower housing member 120. When the mouse scanner 100 is used as a pointing device, the wheel 131 is used to perform scroll or selection of an image displayed on a computer. The reading button 132 is pressed when the document is read by the mouse scanner 100. The transmission plate 140 is a flat plate having a substantially rectangular shape to cover the document reading opening 121. The transmission plate 140, for example, is formed using a transparent plastic plate or a glass plate.

Each of the front foot section 151 and the rear foot section 152 is a sliding member to reduce friction between the mouse scanner 100 and the document, and is made of plastic, urethane or the like. The front foot section 151 and the rear foot section 152 have a plane with a substantially oval shape and a trapezoidal section, and are disposed on the bottom surface 120a to form a convex section on the outer surface of the bottom surface 120a. Thus, when the document is scanned by the mouse scanner 100, the front foot section 151 and the rear foot section 152 make contact with the document.

The front foot section 151 is disposed between the short side of the front side of the bottom surface 120a and the front position detection openings 122. The front foot section 151 has a shape extending along the short side 120s of the bottom surface 120a. The front foot section 151 is disposed such that the distance D4 from the end of the front foot section 151 to the long side 120e is shorter than the distance D1 from the opening end side of the document reading opening 121 to the long side 120e.

The rear foot section 152 is disposed between the short side of the rear side of the bottom surface 120a and the rear position detection openings 123. The rear foot section 152 has a shape extending along the short side 120s of the bottom surface 120a. The rear foot section 152 is disposed such that the distance D5 from the end of the rear foot section 152 to the long side 120e is shorter than the distance D1 from the opening end side of the document reading opening 121 to the long side 120e.

Figure 12A:
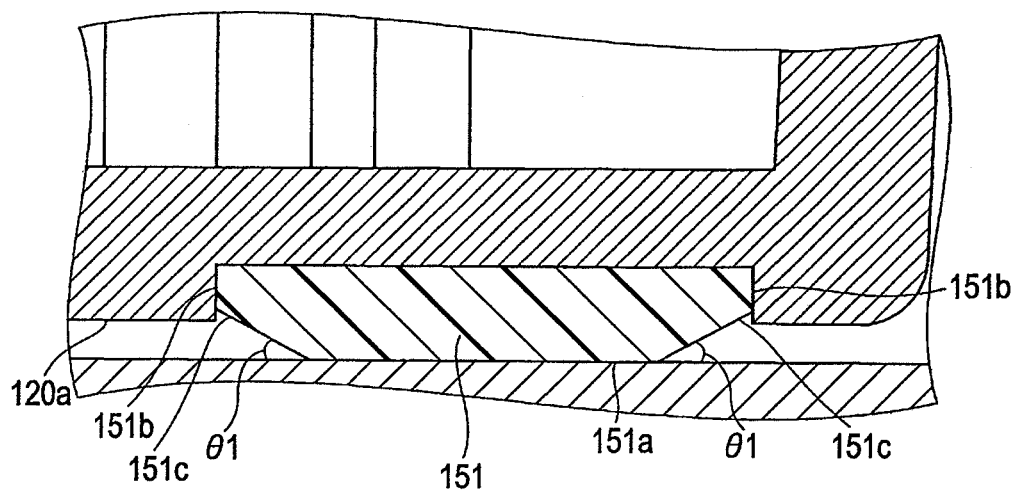
FIGS. 12A and 12B are exemplary views showing sectional shapes of foot sections.
Figure 12B:
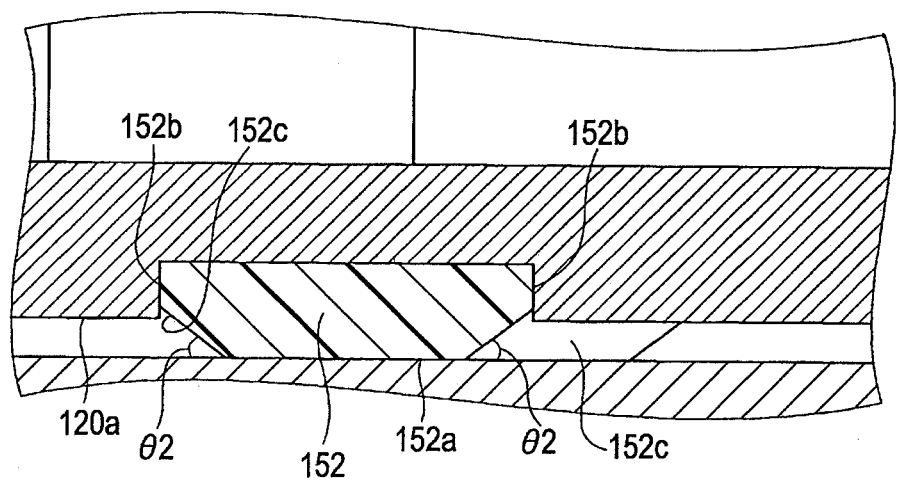

FIGS. 12A and 12B are exemplary views showing the sections of the foot sections. FIG. 12A is a sectional view taken along line XIIA-XIIA of FIG. 11 and FIG. 12B is a sectional view taken along line XIIB-XIIB of FIG. 11. As shown in FIG. 12A, the front foot section 151 includes a contact surface 151a, which makes contact with the document, a lateral side 151b, which is formed in the thickness direction, and a chamfered portion 151c formed between the contact surface 151a and the lateral side 151b. The chamfered portion 151c is configured to have an angle θ1 of 10° to 45° with respect to the document when the contact surface 151a makes contact with the document. It is preferred that the angle θ1 is about 28°.

Similarly to the front foot section 151, as shown in FIG. 12B, the rear foot section 152 includes a contact surface 152a, which makes contact with the document, a lateral side 152b, which is formed in the thickness direction, and a chamfered portion 152c formed between the contact surface 152a and the lateral side 152b. The chamfered portion 152c is configured to have an angle θ2 of 10° to 45° with respect to the document when the contact surface 152a makes contact with the document. It is preferred that the angle θ2 is about 28°.

C2. Arrangement Configuration of Position Detection Module

The mouse scanner 100 has four position detection modules in the housing. The position detection modules are respectively disposed in the small windows of the front position detection openings 122 and the rear position detection openings 123 by allowing each center of the position detection modules to be aligned with each center of the small windows. The position detection module disposed in the right small window (see the left side of FIG. 11) of the front position detection openings 122 will be referred to as a right front position detection module Sfr, and the position detection module disposed in the left small window (see the right side of FIG. 11) of the front position detection openings 122 will be referred to as a left front position detection module Sfl. Further, the position detection module disposed in the right small window (see the left side of FIG. 11) of the rear position detection openings 123 will be referred to as a right rear position detection module Srr, and the position detection module disposed in the left small window (see the right side of FIG. 11) of the rear position detection openings 123 will be referred to as a left rear position detection module Srl.

The position detection modules Sfr, Sfl, Srr and Srl detect the position and direction of the mouse scanner 100 relative to a document, a mouse pad or the like. In detail, the position detection modules Sfr, Sfl, Srr and Srl detect movement amounts in the two directions perpendicular to each other. The mouse scanner 100 determines a relative position relation of an image, which has been read by functioning as the document reading apparatus, and a movement amount of a pointer as the pointing device from the detected movement amounts in the two directions. The mouse scanner 100 detects the movement amounts by using at least two of the position detection modules Sfr, Sfl, Srr and Srl, thereby calculating the rotational direction and rotation degree in addition to the movement direction and the movement amount of the mouse scanner 100.

Figure 13A:
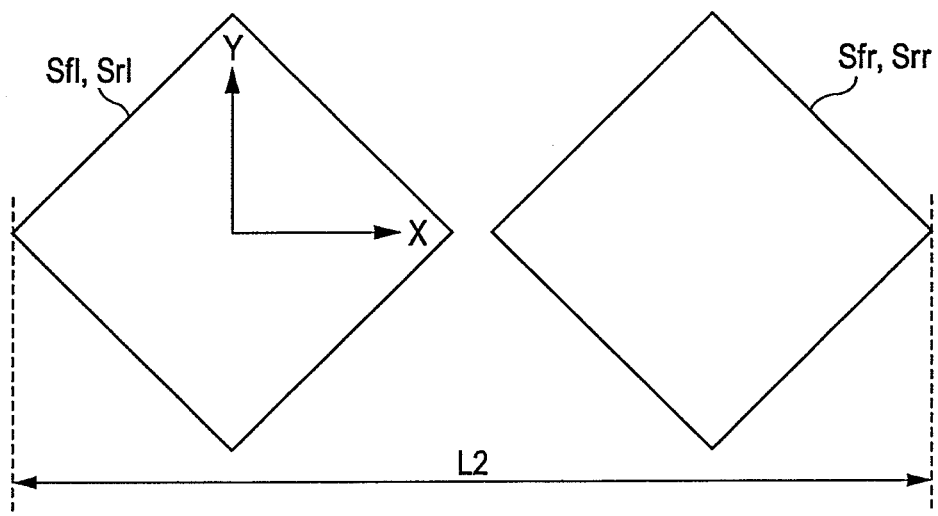
FIGS. 13A and 13B are views showing an arrangement configuration of a position detection module in a mouse scanner.
Figure 13B:
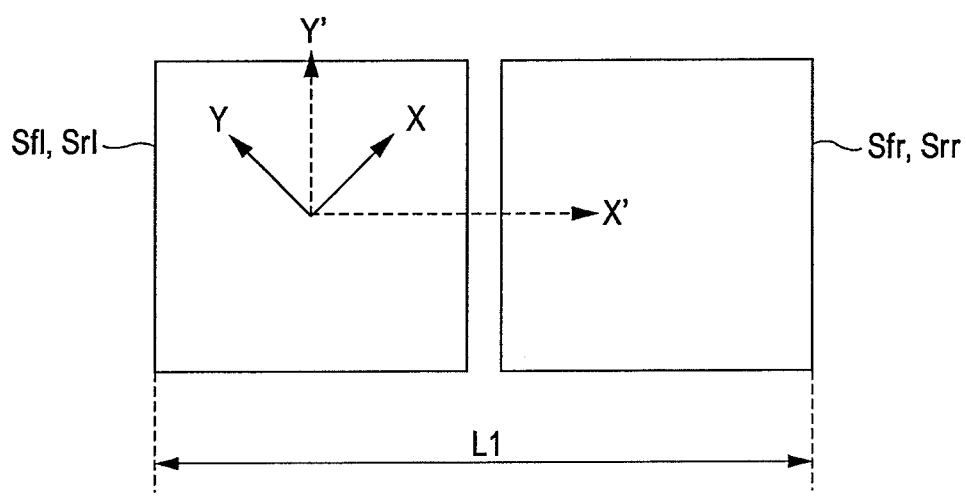

FIGS. 13A and 13B are views showing the arrangement configuration of the position detection modules in the mouse scanner. FIGS. 13A and 13B show the arrangement configuration of the front position detection modules Sfr and Sfl and the rear position detection modules Srr and Srl of the mouse scanner. Each of the position detection modules Sfr, Sfl, Srr and Srl substantially has a plane with a square shape to detect the movement amounts in the diagonal directions. In order to define the movement amount (hereinafter, referred to as a Y-direction movement amount) in one of the diagonal directions as a movement amount in the longitudinal direction of the bottom surface 120a, and the movement amount (hereinafter, referred to as a X-direction movement amount) in the other one of the diagonal directions as a movement amount in the transverse direction of the bottom surface 120a, the diagonal directions of the position detection modules Sfr, Sfl, Srr and Srl must be respectively parallel to the longitudinal and transverse directions of the bottom surface 120a as shown in FIG. 13A.

In the position detection modules Sfr, Sfl, Srr and Srl according to the embodiment, the ends of the modules are configured to be respectively parallel to the longitudinal and transverse directions of the bottom surface 120a as shown in FIG. 13B. Further, the mouse scanner 100 applying Equations (1) and (2) below to the detected Y-direction movement amount and X-direction movement amount, thereby calculating a Y' direction movement amount, which is the movement amount in the longitudinal direction of the bottom surface 120a, and a X' direction movement amount, which is the movement amount in the transverse direction of the bottom surface 120a.

$$Y'=X\cos(45+e)+Y\cos(45+e) \quad\quad 1$$

$$X'=X\cos(45+e)-Y\cos(45+e) \quad\quad 2$$

In Equations 1 and 2, e denotes an installation error when the position detection modules are mounted.

That is, the mouse scanner 100 dividing the detected movement amounts in the diagonal directions of the position detection modules into a longitudinal direction component of the bottom surface 120a and a transverse direction component of the bottom surface 120a, thereby calculating the movement amount in the longitudinal direction of the bottom surface 120a and the movement amount in the transverse direction of the bottom surface 120a. Thus, in the position detection modules Sfr, Sfl, Srr and Srl according to the embodiment, the width L1 in the transverse direction as shown in FIG. 13B is smaller than the width L2 in the transverse direction of the position detection modules disposed as shown in FIG. 13A.

C3. Reading of Document by Mouse Scanner

Figure 14A:
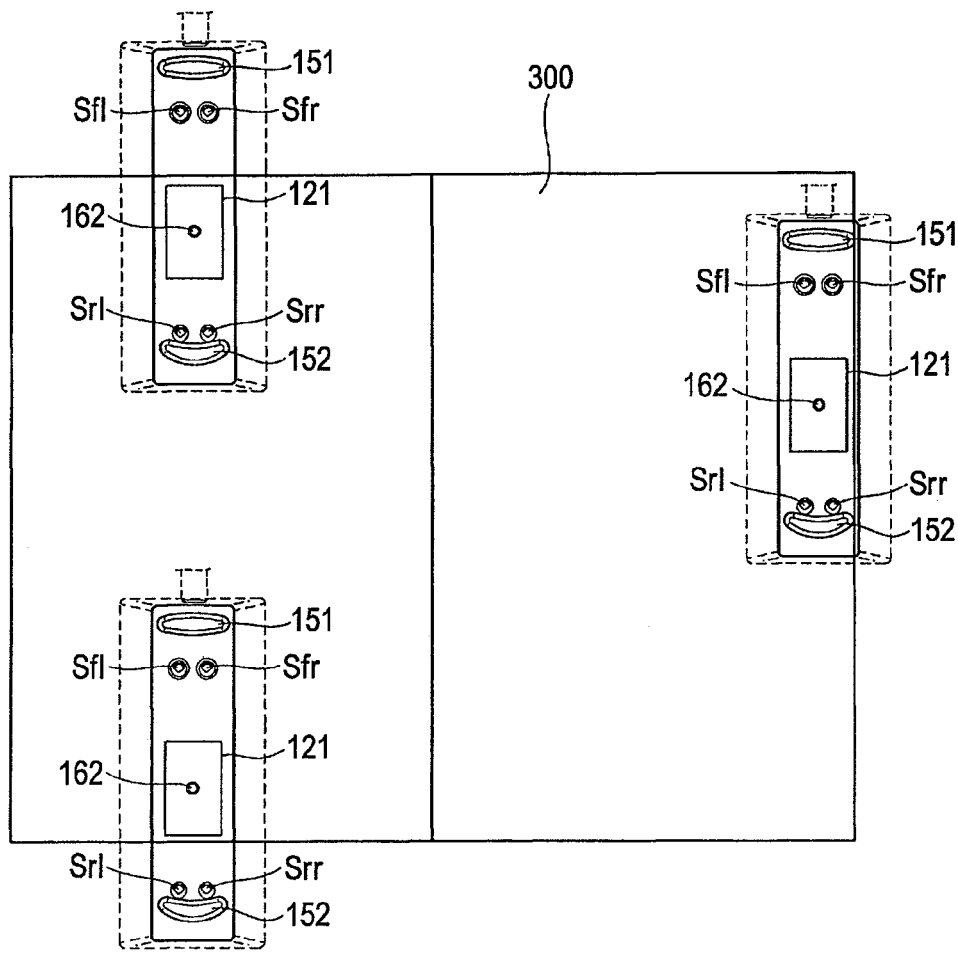
FIGS. 14A and 14B are views showing a state in which a document is read by a mouse scanner.
Figure 14B:
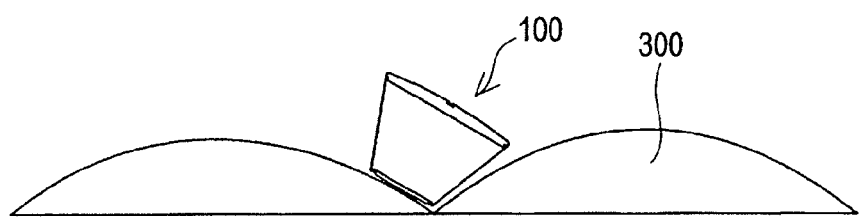
Figure 15A:
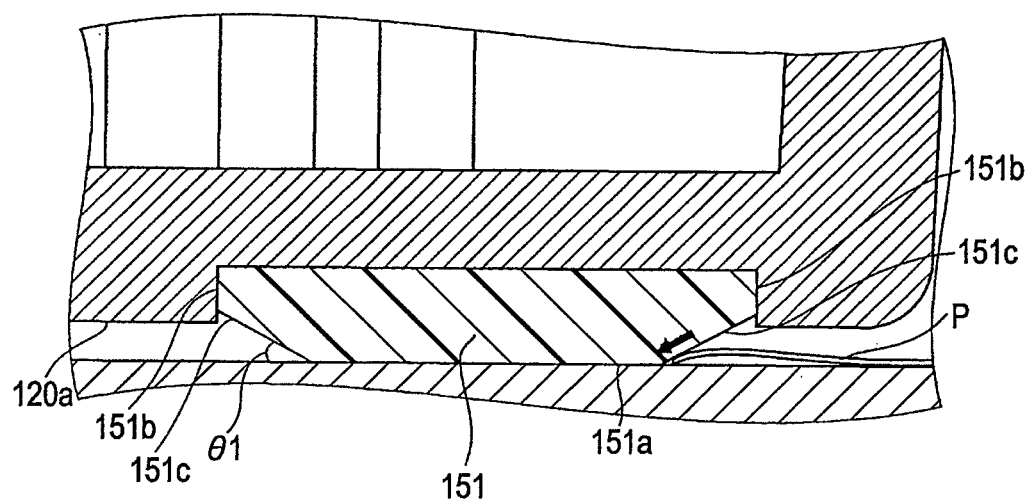
Figure 15B:
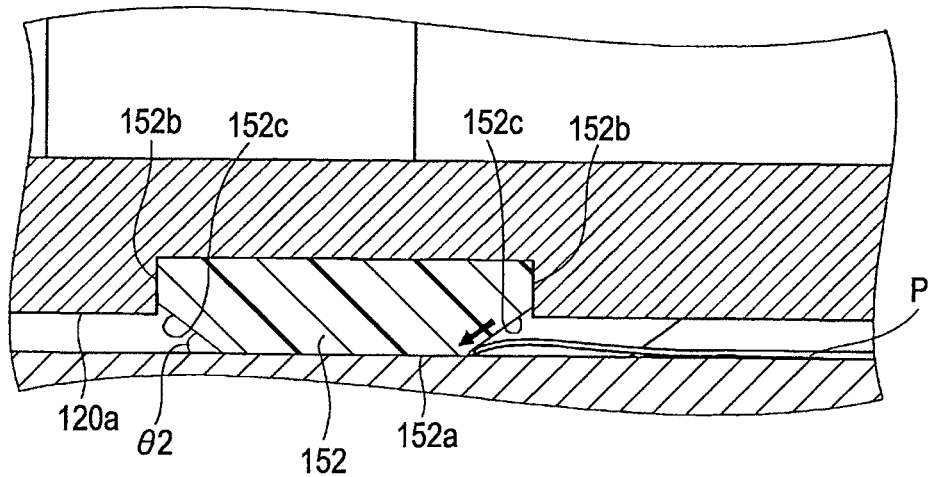

FIGS. 14A and 14B are views showing a state in which the document is read by the mouse scanner. FIGS. 15A and 15B are views showing a state of the vicinity of the foot section when the document is read. As shown in FIG. 14A, when the vicinity of the upper end of the page of the book 300 is read by the mouse scanner 100, a case may occur in which the front position detection modules Sfr and Sfl are departed from the surface of the document. However, even in such a case, the two rear position detection modules Srr and Srl remain on the surface of the document, so that the detection of the movement amount can be performed by the two position detection modules. Further, similarly to this, when the vicinity of the lower end of the page of the book 300 is read by the mouse scanner 100, a case may occur in which the rear position detection modules Srr and Srl are departed from the surface of the document. However, even in such a case, the two front position detection modules Sfr and Sfl remain on the surface of the document, so that the detection of the movement amount can be performed by the two position detection modules.

The position detection modules Sfr, Sfl, Srr and Srl are disposed at the position remote from the long side 120e, as compared with the document reading opening 121. Thus, although the end side of the document reading opening 121 overlaps the edge end portion of the document in order to read the vicinity of the end portion near the fore edge of the page of the book 300, the position detection modules Sfr, Sfl, Srr and Srl remain on the document. Consequently, even in such a case, the detection of the movement amount can be performed using the two or more position detection modules.

Further, the bottom surface 120a of the mouse scanner 100 is formed in the rectangular shape. Thus, even when reading the document having a chevron shape in the vicinity of a valley portion of a page formed at a gutter of the book 300 as shown in FIG. 14B, the width in the transverse direction is suppressed, so that reading of the document can be facilitated. In addition, since the long side 120e substantially has a straight line shape, the mouse scanner 100 is allowed to crawl the valley portion of the page, so that the reading of the document can be facilitated.

As compared with the document reading opening 121, since the front foot section 151 and the rear foot section 152 are located adjacently to the long side 120e, even when reading the vicinity of the end of the document, at least a part of the contact surfaces 151a and 152a easily can remain on the document. Thus, it is possible to prevent the document from being caught when the front foot section 151 and the rear foot section 152, which have been departed from the document, are placed on the document. Further, as shown in FIGS. 15A and 15B, after the front foot section 151 and the rear foot section 152 are departed from the surface of the document in order to read the vicinity of the end of the document, even if the front foot section 151 and the rear foot section 152 are placed on the document again, the end of the document to be contacted is moved downward by the chamfered portions 151c and 152c when they are placed thereon, so that the front foot section 151 and the rear foot section 152 can be easily placed thereon.

According to the mouse scanner 100 of the third embodiment as described above, the long side 120e of the bottom surface 120a is formed in a straight line shape, so that the scanning efficiency can be improved. In detail, the straight line shape of the long side 120e is adapted to the straight line shape of the valley portion of the page of the book, so that the document reading opening 121 can be moved into the relatively deep position of the valley between the pages, as compared with the existing document reading apparatus. Consequently, the reading of the document can be facilitated.

Further, the front foot section 151 and the rear foot section 152 have a shape extending along the short side 120s of the bottom surface 120a, so that the scanning efficiency can be improved. In detail, the front foot section 151 and the rear foot section 152 extend along the short side 120s of the bottom surface 120a, so that a part of the contact surfaces 151a and 152a can easily remain on the document during the scanning operation. Thus, it is possible to prevent the document from being caught when the front foot section 151 and the rear foot section 152, which have been departed from the document, are placed on the document.

In addition, in the transverse direction of the bottom surface 120a, since the distance from the long side 120e to the front foot section 151 and the rear foot section 152 is shorter than the distance from the long side 120e to the document reading opening 121, even when reading the vicinity of the end of the document, at least a part of the contact surfaces 151a and 152a can more easily remain on the document. Thus, it is possible to prevent the document from being caught by the front foot section 151 and the rear foot section 152.

According to the mouse scanner 100 of the third embodiment, the front foot section 151 and the rear foot section 152 have the chamfered portions 151c and 152c, so that the scanning efficiency can be improved. In detail, when the front foot section 151 and the rear foot section 152 are placed on the document, the end of the document to be contacted is moved downward by the chamfered portions 151c and 152c, so that it is possible to prevent the document from being caught.

According to the mouse scanner 100 of the third embodiment, the mouse scanner 100 has the trapezoidal section in the direction perpendicular to the longitudinal direction, so that the scanning efficiency can be improved. In detail, since the width in the short side direction of the upper housing member 110 is wider than the width of the bottom surface 120a, it is easy to hold the document reading apparatus. In addition, during the scanning operation, interference between the housing and the chevron-shaped portion of the page is suppressed, so that the mouse scanner 100 can efficiently perform a scanning operation.

According to the mouse scanner 100 of the third embodiment, since the position detection modules Sfr and Sfl are provided between the front foot section 151 and the document reading opening 121 and the position detection modules Srr and Srl are provided between the document reading opening 121 and the rear foot section 152, at least two position detection modules can remain on the document when the document is read, so that the movement amount and the movement direction of the document reading apparatus can be efficiently detected.

D. Modified Example

The invention is not limited to the previous embodiments. Various Modified Examples can be made within the scope of the appended claims. For example, the following Modified Examples can be made.

D1. First Modified Example

Figure 16:
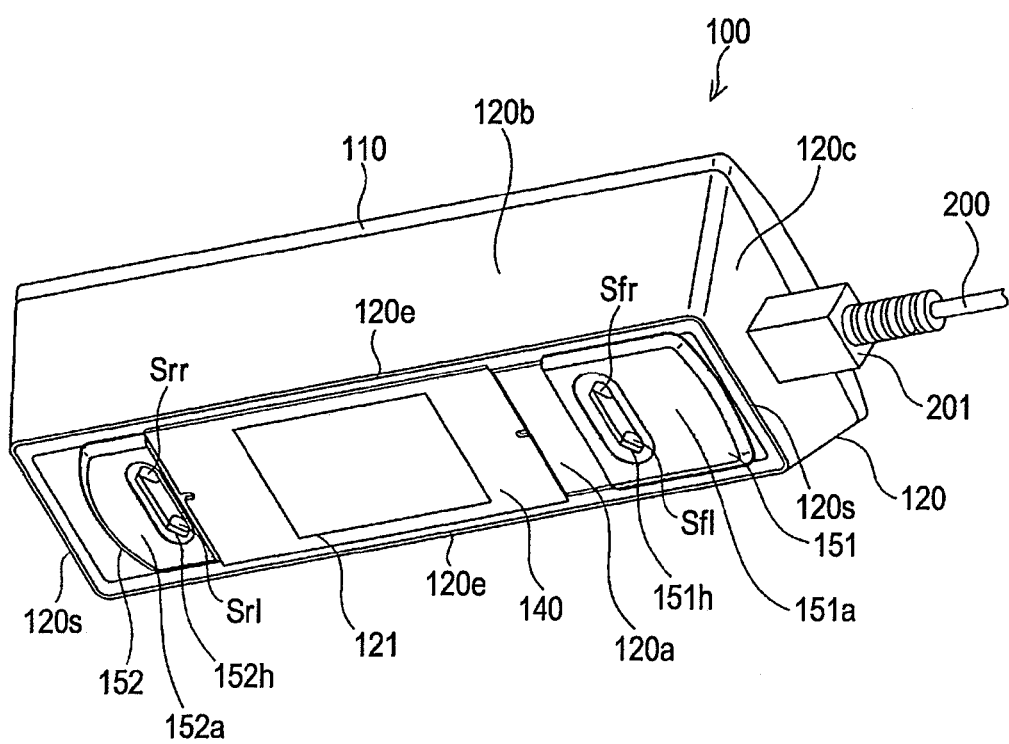
FIG. 16 is an exemplary view showing an external appearance of a lower side of a mouse scanner according to a first Modified Example.

FIG. 16 is an exemplary view showing an external appearance of a lower side of a mouse scanner according to the first Modified Example. In the foot sections 151 and 152 of the mouse scanner 100 according to the first embodiment, one detection opening is formed for each position detection section. However, in the foot sections 151 and 152 according to the Modified Example, two or more position detection sections may be configured to face each other in one detection opening. For example, as shown in FIG. 16, the front foot section 151 may be formed with one detection opening 151h, and two position detection sections (the front left position detection section Sfl and the front right position detection section Sfr) may face each other in the detection opening 151h. Further, similarly to this, the rear foot section 152 may be formed with one detection opening 152h, and two position detection sections (the rear left position detection section Srl and the rear right position detection section Srr) may face each other in the detection opening 152h. In addition, the mouse scanner 100 may have convex sections integrally formed with the housing, instead of the foot sections as shown in FIG. 16. That is, the contact surfaces of the convex sections may have a shape surrounding the position detection sections one by one, or may have a shape surrounding two or more position detection sections simultaneously.

D2. Second Modified Example

Figure 17:
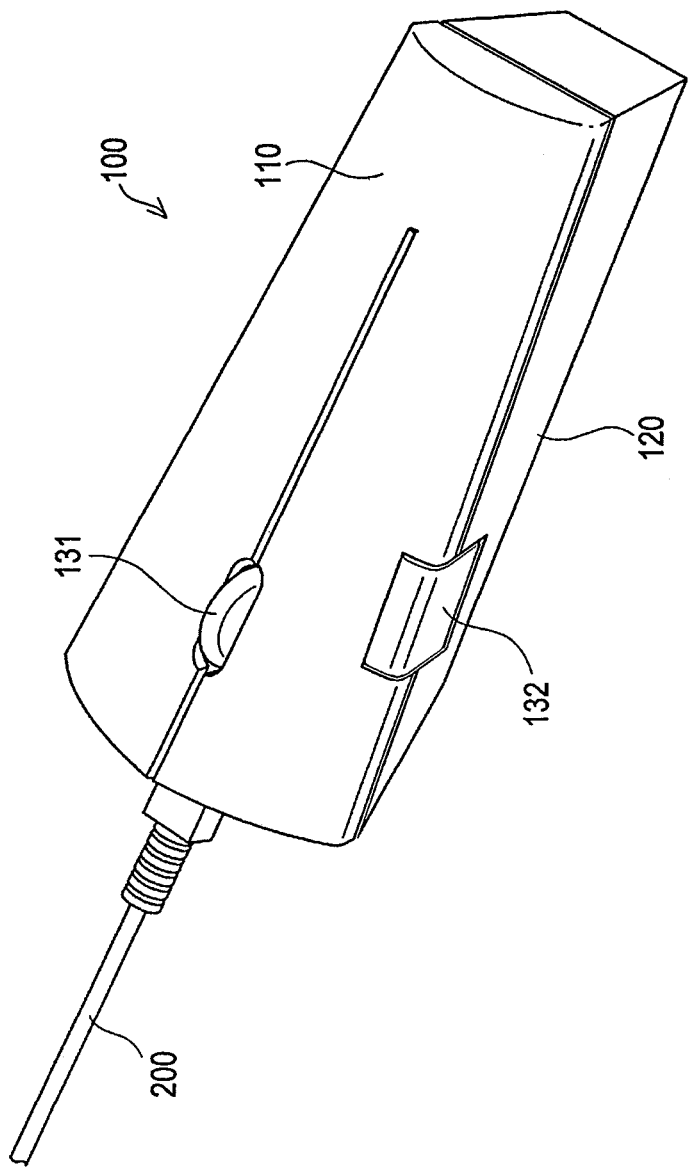
FIG. 17 is an exemplary view showing an external appearance of an upper side of a mouse scanner according to a second Modified Example.
Figure 18:
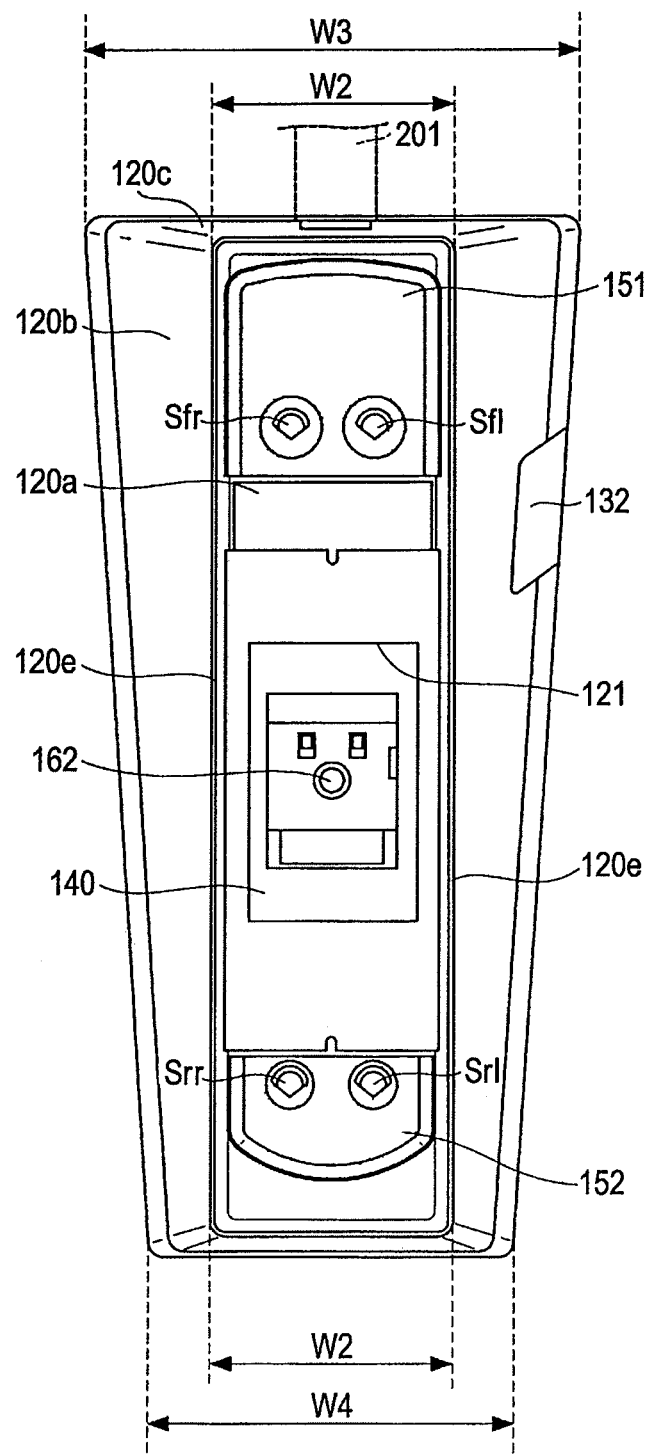
FIG. 18 is a view showing an arrangement configuration of a lower portion of a mouse scanner according to a second Modified Example.

FIG. 17 is an exemplary view showing an external appearance of an upper side of a mouse scanner according to the second Modified Example and FIG. 18 is a view showing an arrangement configuration of a lower portion of the mouse scanner according to the second Modified Example. In the mouse scanner 100 according to the previous embodiments, the upper housing member 110 has an external appearance with the substantially long board shape. However, the shape of the upper housing member 110 is not limited thereto. For example, the upper housing member 110 may have a plane with a trapezoidal shape as shown in FIG. 17. Even in such a case, the scanning efficiency of the mouse scanner 100 can be improved. For example, as shown in FIG. 18, when the width W3 in the short side direction at the front side of the upper housing member 110 is wider than the width W4 at the rear side, it is easy to hold the mouse scanner 100 during the scanning operation and the mouse scanner 100 easily can perform the scanning operation. Meanwhile, the width W2 of the bottom surface 120a is narrower than the width W3 and the width W4, so that the document easily can be read.

The shape of the housing of the mouse scanner 100 is not limited to the shape disclosed in the previous embodiments and Modified Examples, and the housing may have various shapes. For example, the housing of the mouse scanner 100 may be formed in an oval shape and may have a section with a chevron shape. In addition, in the previous embodiments, the upper housing member 110 serves as the cover member. However, the lower housing member 120 may serve as a lower cover.

D3. Third Modified Example

In the mouse scanner 100 according to the previous embodiments, the front foot section 151 and the rear foot section 152 are disposed such that the distance from the ends of the front foot section 151 and the rear foot section 152 to the long side 120e is shorter than the distance from the reading opening 121 to the long side 120e. However, the distance from the ends of the front foot section 151 and the rear foot section 152 to the long side 120e may not be equal to or smaller than the distance from the reading opening 121 to the long side 120e. For example, even if the distance from the ends of the front foot section 151 and the rear foot section 152 to the long side 120e is equal to or larger than the distance from the reading opening 121 to the long side 120e, at least a part of the contact surfaces 151a and 152a easily can remain on the document during the scanning operation. Thus, it is possible to prevent the document from being caught when the front foot section 151 and the rear foot section 152, which have been departed from the document, are placed on the document. Further, it is possible to prevent the problem such as the false detection from occurring due to the position detection section. In addition, if the chamfered portions are provided, it is possible to prevent the document from being caught when the front foot section 151 and the rear foot section 152, which have been departed from the document, are placed on the document again. That is, the front foot section 151 may have a shape which is identical to or different from the rear foot section 152.

D4. Fourth Modified Example

In the mouse scanner 100 according to the previous embodiments, the chamfered portions 151c and 152c have constant angles θ1 and θ2 with respect to the document. However, the angles θ1 and θ2 may not be constant. The chamfered portions 151c and 152c may have different angles in the sectional direction. Further, the invention can be realized without providing the chamfered portion 151c or 152c to one of the foot sections 151 and 152 or both the foot sections 151 and 152.

D5. Fifth Modified Example

In the mouse scanner 100 according to the previous embodiments, one pair of the end sides of the reading opening 121 are formed to be substantially parallel to the long side 120e. However, the position and shape of the reading opening 121 are not limited thereto. For example, the reading opening 121 may have a circular shape, and eccentrically may be located at one side of the bottom surface 120a.

D6. Sixth Modified Example

In the housing of the mouse scanner 100 according to the previous embodiments, the upper housing member is formed with the wheel opening 111. However, the wheel 131 may not be provided. Further, the reading button 132 of the previous embodiments is disposed at the lateral side of the mouse scanner 100. However, the reading button 132 may be disposed at various positions.

D7. Seventh Modified Example

The mouse scanner 100 according to the previous embodiments has a function as the pointing device. However, the mouse scanner 100 may be realized as a document reading apparatus having only a scanning function.

D8. Eighth Modified Example

In the mouse scanner 100 according to the third embodiment, the ends of the position detection modules Sfr, Sfl, Srr and Srl are configured to be respectively parallel to the longitudinal and transverse directions of the bottom surface 120a. However, the arrangement positions of the position detection modules Sfr, Sfl, Srr and Srl particularly may not be limited. For example, the diagonal lines of the position detection modules Sfr, Sfl, Srr and Srl may be configured to be respectively parallel to the longitudinal and transverse directions of the bottom surface 120a. Further, the mouse scanner 100 according to the previous embodiments calculates the movement amount in the longitudinal direction of the bottom surface 120a and the movement amount in the transverse direction of the bottom surface 120a by applying Equations (1) and (2). However, the invention may be realized as a mouse scanner without applying Equations (1) and (2) due to difference or the like in use of the arrangement, the detection direction or the like of the position detection modules.

D9. Ninth Modified Example

The invention can be realized as a copy machine, a facsimile machine or the like, which is provided at a part thereof with a hand scanner, in addition to the hand scanner and the mouse scanner.

What is claimed is:
1. A document reading apparatus comprising:
a housing including a bottom surface formed with a reading opening for reading a document;

position detection sections disposed on the bottom surface while interposing the reading opening therebetween to detect a position of the document reading apparatus; and
foot sections each having a contact surface being in contact with the document and a detection opening formed in a part of the contact surface, the detection opening facing the position detection section on the bottom surface.

2. The document reading apparatus according to claim 1, wherein the bottom surface has a pair of long sides having a straight line shape and a pair of short sides connecting both ends of the long sides, and each foot section is disposed between the reading opening and the short side.

3. The document reading apparatus according to claim 1, wherein a distance in a short side direction of the bottom surface from the long side to the foot section is shorter than a distance in the short side direction from the long side to the reading opening.

4. The document reading apparatus according to claim 1, wherein each foot section has a chamfered portion formed on a circumference of the contact surface.

5. A document reading apparatus comprising:
a housing including a bottom surface having a reading opening for reading a document and a contact surface being in contact with the document; and
position detection sections disposed on the bottom surface while interposing the reading opening therebetween to detect a position of the document reading apparatus,
wherein the contact surface is formed to surround the position detection sections.

6. The document reading apparatus according to claim 1, wherein the housing has a shape extending along a long side direction of the bottom surface, and is formed in a trapezoidal sectional shape in a direction perpendicular to an extension direction.

7. The document reading apparatus according to claim 1, wherein a top surface of the housing has a trapezoidal shape.

8. A document reading apparatus, comprising:
a housing comprising a generally horizontal surface defining a reading opening, wherein the apparatus is configured to read a document through the reading opening;
at least one position detector, configured to detect a position of the document reading apparatus relative to the document; and
a protrusion, protruding in a perpendicular direction from the horizontal surface, and defining a window therein, wherein a distal end of the protrusion is a farthest point of the apparatus in the perpendicular direction, such that the distal end of the protrusion always contacts the document when the apparatus is in use;
wherein the position detector is disposed at substantially the same horizontal position as the protrusion, and is distanced therefrom in the perpendicular direction, such that a distance between the position detector and the document in the perpendicular direction is substantially constant when the apparatus is in use, and such that the position detector has an unimpeded optical path through the window to the document when the apparatus is in use.

9. The document reading apparatus according to claim 8, wherein the protrusion is a foot section comprising a contact surface at the distal end of the protrusion, wherein the contact surface is configured to be in contact with the document when the apparatus is in use, and wherein the window comprises a detection opening in the contact surface.

10. The document reading apparatus according to claim 8, wherein the protrusion comprises a contact surface at the distal end of the protrusion, wherein the contact surface surrounds the position detector and is configured to be in contact with the document when the apparatus is in use, and wherein the window comprises a detection opening in the contact surface.

* * * * *